United States Patent [19]

Rochelle et al.

[11] Patent Number: 4,804,521
[45] Date of Patent: Feb. 14, 1989

[54] PROCESS FOR REMOVING SULFUR FROM SULFUR-CONTAINING GASES

[75] Inventors: Gary T. Rochelle, Austin, Tex.; Wojciech Jozewicz, Chapel Hill, N.C.

[73] Assignee: Board of Regents, The University of Texas System, Austin, Tex.

[21] Appl. No.: 928,337

[22] Filed: Nov. 7, 1986

[51] Int. Cl.$^4$ .......................... C01B 17/00; B01J 8/00
[52] U.S. Cl. ..................................... 423/242; 423/244
[58] Field of Search .......... 423/242 A, 242 R, 244 A, 423/244 R

[56] References Cited

U.S. PATENT DOCUMENTS

| | | | |
|---|---|---|---|
| 3,131,024 | 4/1984 | Leineweber | 23/110 |
| 3,264,130 | 8/1986 | Mays et al. | 106/292 |
| 3,861,935 | 1/1975 | Ohnemuller et al. | 106/306 |
| 3,906,079 | 9/1975 | Tamaki et al. | |
| 3,988,419 | 10/1976 | Mori | 423/155 |
| 4,073,864 | 2/1978 | Atsukawa et al. | 423/242 |
| 4,279,873 | 7/1981 | Felsvang et al. | 423/242 |
| 4,314,980 | 2/1982 | Shen et al. | 423/331 |
| 4,555,392 | 11/1985 | Steinberg | 423/244 |
| 4,602,918 | 7/1986 | Steinberg et al. | 44/51 |
| 4,636,370 | 1/1987 | Dean et al. | 423/235 |
| 4,636,371 | 1/1987 | Farha, Jr. | 423/244 |
| 4,640,825 | 2/1987 | Rosenberg | 423/235 |
| 4,642,225 | 2/1987 | Leikert | 423/244 |
| 4,645,449 | 2/1987 | Schwartz et al. | 431/8 |
| 4,645,652 | 2/1987 | Kimura | 423/235 |
| 4,645,653 | 2/1987 | Kimura | 423/235 |
| 4,645,654 | 2/1987 | Barczak | 423/244 |

FOREIGN PATENT DOCUMENTS 62-213842 9/1987 Japan .
396969 8/1933 United Kingdom ............... 423/244

OTHER PUBLICATIONS

Jozewicz et al., (1986), Environ, Prog., 5:218.
Yang et al. (1979), Aiche J., 25:811.
Dialog Search Report.
Jozewicz et al., (1987) Proceedings: Tenth Symposium on Flue Gas Desulfurization Atlanta, Ga., Nov. 1986, vol. 2, pp. 9–123.
J. He et al., "Comparison of Tuff and Fly Ash in Blended Cement", 64 *Am. Ceram. Soc. Bulletin*, No. 5 (1985), at 707–711.
G. D. Reed et al., "Analysis of Coal Fly Ash Properties of Importance to Sulfur Dioxide Reactivity Potential", 18 Environ. Sci. Technol., No. 7 (1984), at 548–552.
S. L. Marusin, "Experimental Examination of Fly Ash Concrete", 6 Cement, Concrete, and Aggregates, CCAGDP, No. 6 (Winter 1984), at 126–136.
M. W. Grutzeck et al., "Mechanism of Hydration of Condensed Silica Fume in Calcium Hydroxide Solutions" (1984), at 643–664.
P. J. Sereda et al., "Structure Formation and Development in Hardened Cement Pastes" (1980).
F. A. Ayer, "Proceedings: Symposium on Flue Gas Desulfurization Hollywood, Fla., Nov. 1977 (vol. 1)", EPA-600/7-78-058a (Mar. 1978) at 278–291.

(List continued on next page.)

*Primary Examiner*—Gregory A. Heller
*Attorney, Agent, or Firm*—Arnold, White & Durkee

[57] ABSTRACT

The present disclosure relates to improved processes for treating hot sulfur-containing flue gas to remove sulfur therefrom. Processes in accordance with the present invention include preparing an aqueous slurry composed of a calcium alkali source and a source of reactive silica and/or alumina, heating the slurry to above-ambient temperatures for a period of time in order to facilitate the formation of sulfur-absorbing calcium silicates or aluminates, and treating the gas with the heat-treated slurry components. Examples disclosed herein demonstrate the utility of these processes in achieving improved sulfur-absorbing capabilities. Additionally, disclosure is provided which illustrates preferred configurations for employing the present processes both as a dry sorbent injection and for use in conjunction with a spray dryer and/or bagfilter. Retrofit application to existing systems is also addressed.

24 Claims, 7 Drawing Sheets

OTHER PUBLICATIONS

H. F. W. Taylor, "Chapter 5: The Calcium Silicate Hydrates", 1 The Chemistry of Cements 167-232 (1964).

S. Brunauer, "Tobermorite Gel—The Heart of Concrete", 50 American Scientist 210-229 (1962).

S. A. Greenberg et al., "Investigation of Colloidal Hydrated Calcium Silicates. I. Solubility Products", 64 J. Phys. Chem., 1151-1157 (Sep. 1960).

L. Kalousek, "Tobermorite and Related Phases in the System $CaO-SiO_2-H_2O$", J. Amer. Concrete Inst. (Jun. 1955), at 989-1011.

L. Heller et al., "Hydrated Calcium Silicates, Part II, Hydrothermal Reactions: Lime:Silica Ration 1:1", Chemical Society Journal (1951), at 2397-2401.

H. F. W. Taylor, "Hydrated Calcium Silicates, Part I. Compound Formation at Ordinary Temperatures", Chemical Society Journal (1950) at 3682-3690.

H. H. Steinour, "The System $CaO-SiO_2-H_2O$ and the Hydration of the Calcium Silicates", Chem. Reviews (1947), at 391-459.

A. B. Cummins et al., "Diatomaceous Earth: Equilibrium and Rate of Reaction in the System Hydrated Lime-Diatomaceous Silica-Water" 26 Industrial and Engineering Chemistry, No. 6 (1934), at 688-693.

G. Rochelle and P. Chu, "$SO_2/NO_2$ Removal By $Ca(OH)_2$" (Oct. 16, 1986).

J. Peterson, "Kinetic Study of the Reaction: Fly Ash + $Ca(OH)_2$" (Oct. 21, 1986).

J. Peterson and G. Rochelle, "Kinetic Study of the Reaction: $Ca(OH)_2$ + Fly Ash" (Apr. 14, 1987).

J. Peterson and G. T. Rochelle, "Calcium Silicate Reagents for Dry Flue Gas Desulfurization" (Oct. 14, 1987).

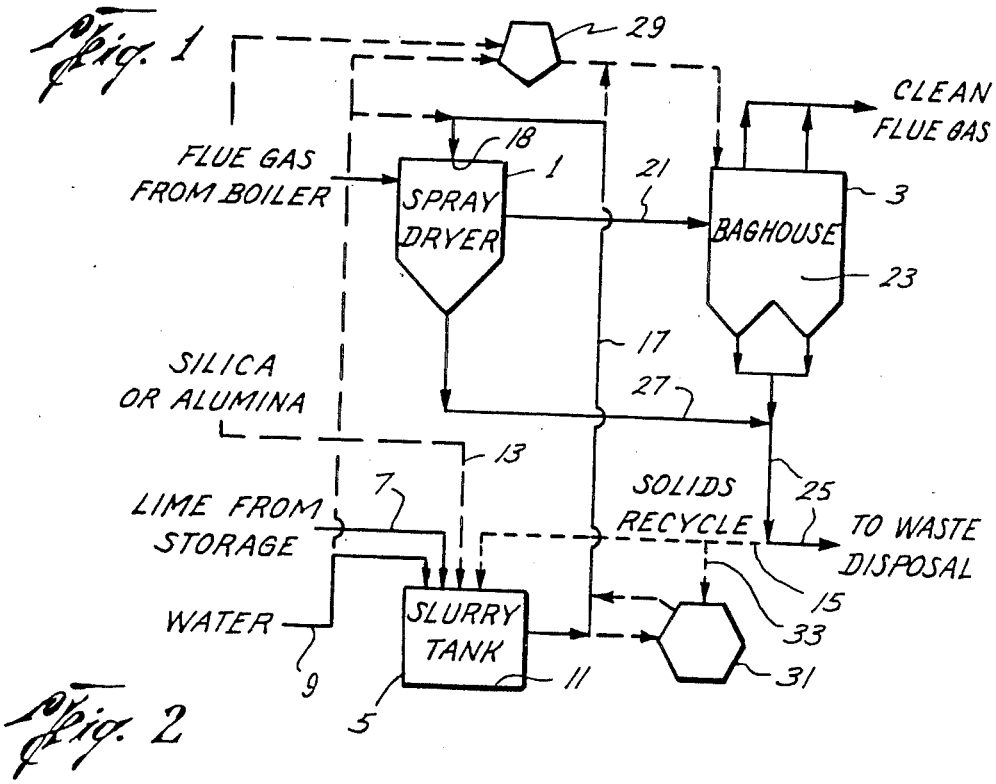
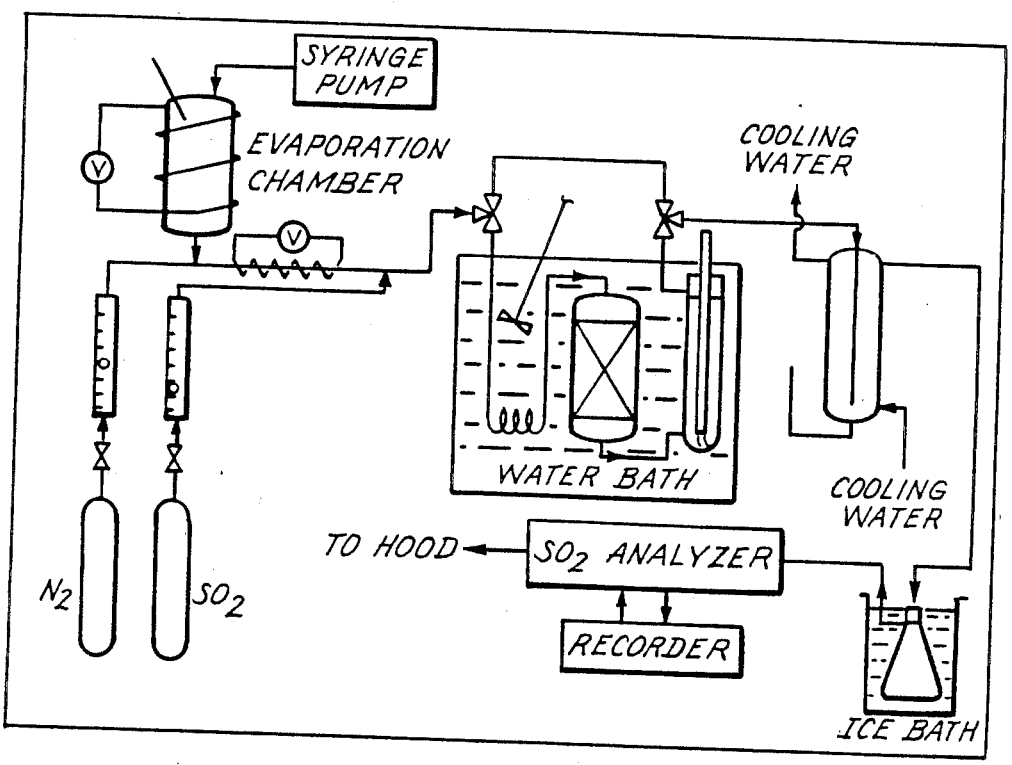

PROCESS FOR REMOVING SULFUR FROM SULFUR-CONTAINING GASES

The government may own certain rights in the present invention pursuant to EPA Cooperative Agreement CR 81-1531.

BACKGROUND OF THE INVENTION

1. Field of the Invention

The present invention relates to processes for reducing the level of sulfur in a sulfur-containing gas. In particular, the invention relates to the use of improved sulfur dioxide-sorbent calcium alkali slurries, which include a calcium-reactive alumina or silica source, in the desulfurization of sulfur-containing flue gases, and methods for improving the sulfur dioxide absorbing capabilities of such slurries.

2. Description of the Related Art

Coal represents one of the most bountiful sources of energy in the world today. For example, it has been estimated that the known coal reserves in the U.S. alone could supply sufficient energy for domestic consumption for several hundred years. Unfortunately much of this coal contains high levels of sulfur which, when the coal is burned, is released into the atmosphere, generally in the form of sulfur dioxide. One of the most serious environmental problems associated with such sulfur emissions is the generation of atmospheric sulfuric acid, resulting in so-called "acid rain."

Attempts at controlling sulfur dioxide emissions from coal burning plants have led to the development of a number of advanced systems and processes for flue gas desulfurization. Fluidized-bed combustion, lime injection, and flue gas desulfurization are some of the examples. In these processes, limestone has been used as a sorbent which forms primarily calcium sulfate at a temperature above 700° C. Regeneration of the sorbent has been a difficult problem because of the high chemical stability of the sulfate. Yet, regeneration is desirable from the points of view of conservation, cost, and ecology. As a result, a considerable amount of research effort has been expended in developing alternate sorbents which are regenerative as well as reactive to sulfur dioxide.

Fluidized bed combustion (FBC) and scrubbers for flue gas desulurization (FGD) represent two of the more promising advanced processes for power generation. FBC relates to the combustion of coal with limestone particles as the bed material, and has received increasing attention as a promising and versatile technology for clean power generation. Equally promising has been FGD, wherein sulfur-reactive sorbents are employed to remove slfur from flue gases prior to their venting into the atmosphere. In developing the technologies for FBC and FGD, a search for sorbents more effective than limestone, especially ones which are economically regenerative, has been a challenging task.

Flue gas desulfurization by the means of spray dryer absorber and bag filter or electrostatic precipitator has recently received much attention. In the spray dryer/bag filter system, flue gas is contacted with a fine spray of an aqueous solution or slurry of a reactive alkali (typically lime), with $SO_2$ removal and drying occuring simultaneously. The sulfur dioxide is absorbed into the water droplet during the constant rate period of drying until it shrinks to the extent that the particles touch each other. During the following falling rate period, the remaining water diffuses through the pores of agglomerated particles until the solids establish pseudo-equilibrium with the humid environment of spray dryer.

The third stage of drying may be called the second-falling rate period. Any drying/mass transfer during this period is limited by the diffusion of moisture from within tightly packed particles. The first two stages take place exclusively in the spray dryer. The majority of pseudo-equilibrium period occurs in the duct joining spray dryer and bag filter and in the bag filter itself. Since not all moisture is removed from the solids in the spray dryer, the remaining moisture promotes further removal of $SO_2$ in the bag filter. Therefore the total $SO_2$ removal in the system is a sum of removal in the spray dryer and bag filter.

The recycle of product solids is among the options that have been tested to increase the utilization of reagent. Numerous reports indicate that recycle of product solids and fly ash results in substantial improvement of reagen utilization and $SO_2$ removal. This option provides a higher $Ca(OH)_2$ concentration in the slurry feed at the same $Ca(OH)_2$ stoichiometry (moles of $Ca(OH)_2$ fed to the system/moles of $SO_2$ in the feed gas). In one pilot plant, increasing the recycle ration (g solids recycled/g fresh $Ca(OH)_2$) from 6:1 to 12:1 increased $SO_2$ removal in the spray dryer from 70% to 80% at stoichiometry 1.0 (Blythe et al., 1983, *Proceedings: Symposium or Flue Gas Desulfurization*, Vol. 2, NTIS PB84-110576). In another installation, compared to once-thru tests, recycle tests gave 10 to 15% more $SO_2$ removal at stoichiometry 1.5 (Jankura et al., presented at the *Eighth EPA/EPRI . Symposium on Flue Gas Desulfurization*, New Orleans, La., 1983).

Another option enhancing lime utilization uses the recycle of both solids captured downstream in the spray dryer and solids from the baghouse. However, removal does not appear to be significantly different when either spray dryer solids or fabric filter solids are employed as the recycled material. At stoichiometry 1.0 the removal increased from 53% when no recycle was employed to 62% with 0.5:1 recycle ration. When ash content in the feed slurry increased from 5% to 20%, $SO_2$ removal in the spray dryer increased from 80% to 92% for stoichiometry 1.6 (Jankura et al., 1983).

U.S. Pat. No. 4,279,873, to Felsvang et al., relates several experiments investigating the effects of fly ash recycle and proved it to be beneficial for $SO_2$ removal in a spray dryer. It was found that substantially higher removal of $SO_2$ may be achieved when recycling the fly ash and $Ca(OH)_2$ than when recycling $Ca(OH)_2$ alone. Corresponding efficiencies for stoichiometry 1.4, 500 ppm inlet $SO_2$, and comparable solids concentration were 84% and 76%, respectively. For the same stoichiometry and $SO_2$ concentration, removal was only 67% for the simple once-thru process. At low $SO_2$ concentration and high recycle rations, over 90% removal was achieved even at extremely low stoichiometries. At 548 ppm $SO_2$, 25:1 recycle, 0.76 stoichiometry and at 170 ppm $SO_2$, 110:1 recycle, 0.39 stoichiometry, $SO_2$ removal was 93.8% and 97.8%, respectively.

Removal efficiencies up to 65% were reported with a slurry of highly alkaline (20% CaO) fly ash only (Hurst and Bielawski, *Proceedigs: Symposium on FGD*, EPA-600/9-81-019b, 853–860, 1980). In another experiment, 25% $SO_2$ removal was achieved when spraying slurried fly ash collected from a boiler burning 3.1% sulfur coal (Yeh et al., Proceedings: Symposium on Flue Gas Desulfurization, EPRI CS-2897, 821–840, 1983). A weak trend was found in a study of 22 samples of fly ashes that a slurry with a higher total slurry alkalinity tended to have a higher SO$_2$ capture (Reed et al., *Environ. Sci. Technol.*, 18, 548–552, 1984).

Therefore, while it is clear that desulfurization processes employing flue gas scrubbers represents an important advance, it is equally clear that such techniques presently have economic and technical drawbacks, not the least of which is the low degree of reagent utilization. While recycle of product solids with fly ash has resulted in some improvement, such processes are still not economically feasible for certain applications, and much room remains for the improvement of reagent utilization in such systems.

SUMMARY OF THE INVENTION

Accordingly, the present invention is directed to improved processes for reducing the level of sulfur in a sulfur-containing gas which in their most general and overall scope include four basic steps. One step involves the preparation of an aqueous slurry comprising a calcium alkali together with a calcium-reactive silica or alumina which are present in amounts sufficient to allow for the formation of a sulfur dioxide-absorbing component which includes a calcium silicate or calcium aluminate. Virtually any composition which includes a calcium alkali (CaO or Ca(OH)$_2$) may be employed in the practice of the present invention. For example, calcium alkali in the form of lime, slaked lime, hydrated lime, calcidic lime, dolomitic lime, calcium hydroxide or calcium oxide may be employed. For economic reasons, due to its lower cost, a preferred embodiment of the present invention employs lime or slaked lime.

Similarly, virtually any composition which includes a calcium reactive silica or alumina may be employed, wherein a calcium-reactive silica or alumina is defined as a source of silica or alumina which is readily soluble in alkaline solutions. Such compositions include, but are not limited to, fly ash, diatomaceous earth, clay, bentonite, montmorillonite, activated alumina, or silicic acid. Again, for economic reasons, one would generally employ fly ash in that fly ash is a natural by-product of coal combustion and is therefore readily available at coal burning power plants. Thus, fly ash may be included in the slurry in the form of spent solids.

Although some degree of sulfur absorption may be obtained with slurries which contain virtually any mass ratio of calcium reactive silica or alumina to calcium alkali, in one embodiment, mass ratios rnging from about 1:1 to about 16:1, respectively, are preferred. In a more preferred embodiment, the slurry comprises a mass ratio of calcium reactive silica or alumina to calcium alkali from about 1:1 to about 5:1, respectively.

As with mass ratio, the total amount of solids which are slurried is not of critical importance. However, the total solids amount will generally be determinative of the amount of sulfur which is removed from the gas by the slurry. Typically, about one to three moles of calcium alkali is added for every mole of sulfur to be removed from the gas. However, in a more preferred embodiment, the slurry comprises about one to two moles of calcium alkali for every mole of sulfur to be removed from the gas.

In a further embodiment, the slurry also includes sodium hydroxide in a concentration ranging from about 0.03 molar to about 1 molar. More preferably, the slurry comprises about 0.05 to about 0.5 molar sodium hydroxide. Even more preferably, the slurry comprises sodium hydroxide in a concentration ranging from about 0.1 molar to about 0.25 molar. Therefore, typically, the slurry will comprise about 0.02 to 0.3 moles of sodium hydroxide for every mole of calcium alkali. Or more preferably, 0.05 to 0.2 moles of sodium hydroxide for every mole of calcium alkali.

Another step of the most general process of the present invention involves heating the slurry to a temperature above ambient in a manner to facilitate the formation of the sulfur dioxide-absorbing component. Virtually any increase in temperature of the slurry over ambient, as well as increases in slurrying time, will result in an improved sulfur dioxide absorbing slurry. The upper temperature limit is bounded only by temperatures at which the calcium reactive silicates or aluminates will become dehydrated. Generally, such dehydration will occur at temperatures approaching 200° centigrade. It is believed that dehydrated calcium silicates or aluminates will not prove as advantagous in sulfur absorption as hydrated calcium silicates or aluminates. Moreover, extremely high slurrying temperatures (for example, above 200° C.) will generally prove to be uneconomic in commercial practice.

Therefore, in a preferred embodiment, the slurry is heated to between about 40° and about 100° C. for between about 0.5 and about 48 hours. In one embodiment, the slurry is heated to between about 40° and about 60° C. for between about 2 and about 36 hours. More preferably, the slurry is heated for between about 4 to about 12 hours. In another embodiment, the slurry is heated to between 60° and about 80° C. for between about 1 and about 24 hours. More preferably, the slurry is heated at such temperatures for between about 2 and about 12 hours. In still another embodiment, the slurry is heated to between about 80° and about 100° C. for between about 0.5 and 12 hours. More preferably, the slurry is heated to such temperatures for between about 1 and about 8 hours.

Thus, it has been noted, that the temperature to which the slurry is heated and maintained is inversely proportional to the amount of time necessary to obtain highly sulfur-reactive calcium silicates and aluminates.

Another step of the most general process requires contacting gas with the heat-treated slurry in a manner sufficient to allow for absorption of sulfur-dioxide by the absorbing component. Numerous embodiments are known in the art for performing such a contacting step. In a preferred embodiment, the contacting step includes atomizing the slurry into a stream of the sulfur-containing gas, drying the resulting atomized droplets so as to form a gas/solid suspension having a gaseous component and a solid component which solid component includes the sulfur-dioxide-absorbing component, and retaining the gaseous and solid components in contact in a manner sufficient to allow for the absorption of the sulfur dioxide by the absorbing component.

In one embodiment, the contacting steps further includes directing the gas/solid suspension onto a reaction surface to allow for deposition of the solid component onto the surface, and passing the suspension over the deposited solid component in order to: (1) further effect absorption of the sulfur-dioxide by the absorbing component, (2) effect a separation of the gas from the solid component and, (3) further effect a drying of the solid component. Typically, the reaction surface will include a bagfilter. However, in certain embodiments which do not employ a bagfilter, the process includes carrying the gas/solid suspension in a stream to allow for substantial contact between the gaseous and solid component and separating the solid component from the gas by means of an electrostatic precipitator or cyclones. Therefore, the bagfilter, electrostatic precipitator and cyclone offer alternative means for separating sulfur-absorbed solids from the gas. However, as will be appreciated, the bagfilter alternative offers the additional benefit of providing a reaction surface particularly well adapted to the practice of the present invention.

Due to economic and other considerations, one should typically employ a recycling of a portion of the sulfur-absorbed solids back to the aqueous slurry. This will achieve not only a partial regeneration of the sulfur absorbed solids but will also improve the performance, and economics, of the process. Therefore, the process can be seen as a cyclical process wherein a portion of sulfur absorbed solids are recycled to form a slurry which includes an admixture of sulfur absorbed solids and the calcium alkali. Since flue gas itself will typically contain sufficient fly ash content, there is generally no need to add fly ash directly to the slurry, it being added in the form of spent solids.

In a process embodiment directed primarily to dry injection technology, the steps of preparing an aqueous slurry, and heating the slurry, are the same as in the general overall embodiment. However, following heating of the slurry, for dry injection purposes, the slurry is dried to provide a solid component which includes the sulfur dioxide-absorbing component, prior to contacting the gas with the sulfur dioxide-absorbing material. In this embodiment, it has been found that the gas must be conditioned to a relative humidity of between about 5 and 95%. Additionally, the temperature of the hot flue gas must be conditioned to between about 120° and 40° C. Preferably, the relative humidity of the humidified gas is brought to between about 20% and 80% and its temperature to between about 60° and 100° C. More preferably, the relative humidity of the humidified gas is brought to between about 30% and 70% and its temperature is reduced to between about 65° and 85° C. It will be appreciated that the most convenient means of achieving a humidification of a gas, and temperature reduction of gas, will be through the utilization of water, for example, mixed with the gas in a humidifier, prior to contacting the gas with the solid component. However, other methods of conditioning could be employed as exemplified by cooling of the flue gas or by steam injection into the flue gas.

Another step in the dry injection process involves contacting the humidified gas with the dried or partially dried solid component to form a gas/solid suspension, for a period of time sufficient to allow some absorption of gaseous sulfur dioxide by the solid component, and separating the solid component from the gas in the form of spent solids. This step can be achieved by the previously mentioned contactors and/or separators including bagfilter, electrostatic precipitators (ESP), and cyclones.

BRIEF DESCRIPTION OF THE DRAWINGS

FIG. 1—Schematic Diagram of a Spray Dryer System.

FIG. 2—Experimental apparatus.

DETAILED DESCRIPTION OF THE INVENTION

The $CaO$-$SiO$-$Al_2O_3$-$H_2O$ Sulfur Absorbtion System

Figure 3:
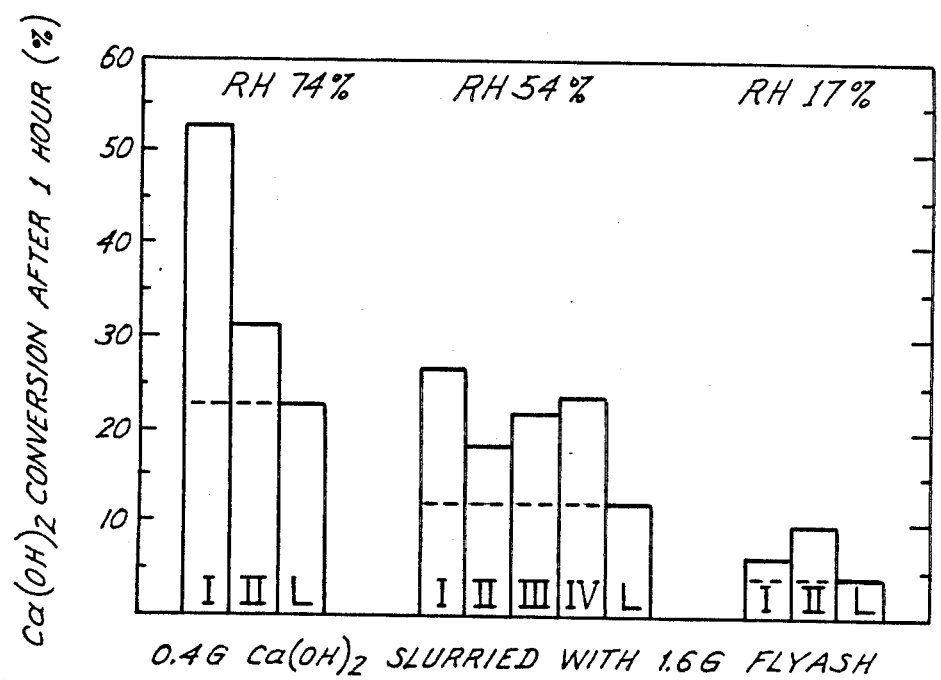
FIG. 3—The effect of fly ash I, II, III, and IV and relative humidity on $Ca(OH)_2$ utilization. 0.4 g of $Ca(OH)_2$ slurried with 1.6 g of fly ash I for 4 hours at 65° C. Atmospheric drying used for the preparation of samples. L=$Ca(OH)_2$ alone.

The nature of calcium silicate hydrate and calcium aluminate hydrate as well as calcium aluminate silicate hydrate formation in $CaO$-$SiO_2$-$Al_2O_3$-$H_2O$ systems is very complicated. It is usually impossible to assign a simple chemical formula to it, especially at ordinary temperatures of interest in flue gas desulfurization. At temperatures from 20° C. to about 100° C., two main calcium silicate hydrates are formed, mono- and dicalcium silicate hydrates. Their ratio appears to depend on the initial ratio of calcium to silica in the slurry. Both monocalcium silicate hydrate—$CaOxSiO_2xH_2O$—and dicalcium silicate hydrate—$(CaO)_2xSiO_2xH_2O$—are fibrous gels of specific surface areas in the range of 100–300 m²/g. At 20°–100° C. after 8 hours of hydration, tobermorites (calcium silicate hydrates) may crystallize, also of high surface area.

The reaction of fly ash and $Ca(OH)_2$ in the presence of water is called a pozzolanic reaction. A pozzolan is a siliceous or siliceous and aluminous material which in itself possesses little or no cementitious value but will, in finely divided form and in the presence of moisture, chemically react with calcium hydroxide at ordinary temperatures to form compounds possessing cementitous properties. Due to small particle size and generally noncrystalline character, fly ash usually shows pozzolanic properties, or pozzolanic and cementitous properties in case of high-calcium ashes. High-calcium fly ash contains tricalcium aluminate hydrate, which is the most reactive mineral present within portland cement. Pozzolanic reactions give products with cementitous properties and with high surface area that can enhance $SO_2$ removal.

Pozzolan originated as a mortar of lime and ash (from Pozzouli, Italy) which the Romans used for stone constructions. The definition of pozzolanic reaction implies that spray dryer off-products, fly ashes, clays, and sands should be able to provide components to form calcium silicate hydrates, calcium aluminate hydrates, calcium alumino-ferrite hydrates, calcium sulfo-aluminate hydrates (ettringites), and calcium sulfo-aluminate-ferrite hydrates. However, not all siliceous and aluminous minerals are pozzolans (Chatterji et al., 1983). Crystalline minerals (mullite, silica as quartz) do not react with lime, especially at ordinary temperatures. Siliceous and/or aluminous materials must be non-crystalline and in small particles, in order to provide silica and alumina, after hydration in alkaline solutions, to form cementitous products. These reactions are the ones which constituents of portland cement undergo in the presence of water. The hydration reaction of aluminates in the presence of gypsum and lime and reaction of calcium silicates are as follows:

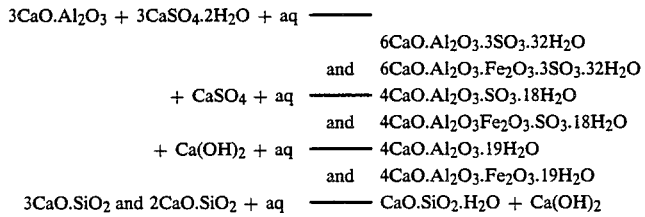

Typical portland cement consists of 50% tricalcium silicate, 25% dicalcium silicate, 10% tricalcium aluminate, 9% calcium alumino-ferrite, and 6% calcium sulfate. Tricalcium silicate appears to be the most reactive mineral present within the portland cement. The main product of hydration of portland cement's silicate materials is calcium silicate hydrate of colloidal dimensions. All calcium silicate hydrates are fibrous gels in early stage of formation and their surface area is in the range of 100-300 $m^2/g$. Moreover, Tobermorite gel plays a vital role in establishing the strength of concrete.

When considering the spray dryer/bag filter system, typically one is dealing with fly ash as a source of silica instead of amorphous silica. The solubility of quartz particles of 3-15 um diameter in water is 11 ppm at 25° C. and 60 ppm at 100° C. The corresponding values for amorphous silica are 130 ppm and 420 ppm, respectively. Temperature and pH have strong effects on the solubility of amorphous silica. When pH was adjusted with NaOH up to 10.5 from 7 at 25° C, solubility was found to increase to 1000 ppm. Above a pH of 10.7, all the solid phase of amorphous silica dissolves to form soluble silicate. Therefore it would be reasonable to expect the dissolution of fly ash to be the limiting step in the formation of calcium silicate hydrates. Because of the lower solubility of fly ash, the specific surface area of the $Ca(OH)_2$/silica reaction product is smaller than values reported for laboratory studies with amorphous silica. Also, it is not clear whether the development of the specific surface area of the product of hydration (for a given ratio of $Ca(OH)_2$/fly ash) increases proportionally to the amount of conditioned lime.

Because of low fly ash reactivity it is often desirable to know the exact characteristics of fly ash to be used. Usually fly ashes are divided into two categories: low-calcium (containing less than 5% of analytical CaO) from burning bituminous or anthracite coals and high-calcium (up to 35% Ca) from burning lignite or subbituminous coals. However, from the point of perspective reactivity and formation of calcium silicate hydrates, it is generally more important how much more amorphous material there is within the fly ash as compared with crystalline substances. Higher contents of crystalline phases (alpha-quartz, mullite, sillimanite, hematite, magnetite) lowers the reactivity of fly ash. Low-calcium fly ashes consist mainly of aluminosilicate glass due to the high proportions of silica and alumina. However, some crystallization takes place in the boiler when fly ash is cooling and, as a result, crystalline phases are detected under glass.

For high-calcium fly ash it appears that the glass structure is different. It has been postulated that it is composed of significant amounts of CaO and $Al_2O_3$, which is known to be highly reactive. Since the non-crystalline component comprises sometimes as much as 80% of high-calcium fly ash it seems that the reason for high reactivity of high-calcium fly ash may be in the composition of glass. On the other hand, higher contents of unburnt carbon in the low-calcium fly ash may add to its reactivity. These carbon particles are usually of high internal surface area and may bind water and admixtures when the fly ash is slurried.

In a study of surface area and porosity of fractionated fly ash from burning low-sulfur, high-ash coal, the largest fraction (>125 um) had a surface area of 9.44 $m^2/g$ whereas the finest fraction (>7 um) had a surface area of $1.27^2/g$. Since large particles constitute a small fraction of fly ash only, the above effect is relatively insignificant. Industrial experiments should outperform laboratory tests, since it has been found that high-calcium fly ash passed the lime pozzolanic activity test when commercial source of lime was used, but failed to do so in the presence of a reagent grade $Ca(OH)_2$. This effect is possibly the result of impurities in lime which have formed poorly-crystallized hydrates.

The prospect of having calcium silicate hydrates in the spray dryer/bag filter therefore appears to be very attractive since they have high surface area and are highly hydrated and therefore should offer high $SO_2$ removal potential. The formation would take place in the recycle system, specifically in the reactant tank. during fly ash recycle in dry flue gas desulfurization systems, reaction of fly ash with makeup $Ca(OH)_2$ probably takes place in several steps. First lime would be dissolved, then silica and alumina—originally contained within the fly ash—would be digested and, by the means of providing favorable slurrying conditions, calcium silicate/aluminate hydrates would be formed.

System Overview

Referring to FIG. 1 is seen a diagram of a typical spray dryer system which is particularly well suited to the practice of the processes of the present invention. Depicted therein is a spray dryer 1, a baghouse 3, and a slurry tank 5. The slurry tank 5 is adapted to receive calcium alkali, in the form of, for example, lime from storage by means of conduit 7, and water by means of conduit 9. The slurry tank further includes a heating element 11 adapted to heat the slurry for times and to temperatures in accordance with processes of the present invention. The system may be adapted to provide calcium reactive alumina or silica directly to the slurry from storage by means of conduit 13 or, alternatively, calcium reactive silica or alumina is supplied to the slurry tank 5 by means of a recycle conduit 15 containing a sulfer-absorbed solids recycle, which includes, for example, fly ash from the boiler.

To obtain best results, the slurry tank 5 is designed to mix a mass ratio of water to solids ranging from 1:1 to 20:1. Moreover, the slurry tank 5 and heating element 11, are adapted so as to enable a heating of the slurry to a temperature ranging from about 40° C. to about 140° C for between about 0.5 to about 48 hours.

The heat-treated slurry is conveyed to the spray dryer 1 by means of conduit 17. In the spray dryer 1, the slurry is admixed with flue gas from the boiler by means of a rotary atomizer 19. The gas/slurry mixture is partially dried in the spray dryer 1 which is typically designed to achieve a gas/slurry contact time of between about 2 and about 10 seconds. In addition, a partial absorption of sulfur by the slurry is achieved in the spray dryer 1.

From the spray dryer 1, the partially dried particles sulfur-absorbed gas/slurry admixture is conveyed to the baghouse 3 by means of conduit 21, wherein further drying and further absorption of sulfur by the sulfur-adsorbing component of the slurry takes place. Within the baghouse 3, the gas/slurry mixture is directed onto a bagfilter 23 wherein sulfur-absorbed solids are deposited and futher absorption and drying takes place. The bagfilter 23 thus serves a dual purpose of separating gas from dried solids and collecting the solids for disposal by means of conduits 25, or recycle of solids by means of conduit 15. Separated gases are vented by means of conduit 29. Solids collected in the spray dryer are mixed with baghouse solids by means of conduit 27. Typically, the baghouse 3 and bagfilter 23 are designed to achieve a residence time of between about 5 and 300 minutes.

In system embodiments for use in conjunction with dry injection of solids, the system will typically include a humidifier 29 in place of the spray dryer 1, wherein hot flue gas is admixed with water to provide humidified, cooled gas. Moreover, the system would also further include a drying tank 31 wherein the slurry is dried prior to admixture of the dried slurry with the humidified gas. Additionally, the dry injection system may include a recycle conduit 33 for admixture of recycled solids with the slurry mixture in the drying tank 31, to futher assist in drying the slurry mixture. Alternatively, the spray dryer 1 itself can serve as a combination humidifier and injector wherein the dried slurry is injected into the spray dryer 1 along with water to provide admixture of the dried slurry together with the water and the gas.

EXAMPLE I

Lab Scale Experiments

Apparatus

Experiments were conducted in the apparatus shown in FIG. 2. The glass reactor (40 mm in diameter, 120 mm in height) was packed with a powdered reagent mixed with 40 g of 100 mesh silica sand to prevent channelling of $Ca(OH)_2$. The reactor was immersed in a water bath thermostated to within approximately 0.1° C. Simulated flue gas was obtained by mixing nitrogen and sulfur dioxide from gas cylinders. The flow of gas was monitored using rotameters. Water was metered by a syringe pump, evaporated, and injected into dry gas. Reactor upstream tubing was heated to prevent the condensation of the moisture.

Before entering the analyzer, the gas was cooled and water condensed in an ice bath. The $SO_2$ concentration was measured with a pulsed fluorescent $SO_2$ analyzer (ThermoElectron Model 40). A bypass of the reactor was provided to allow preconditioning of the bed and stabilization of gas flow at the desired $SO_2$ concentration. Prior to each run the bed was humidified by passing pure nitrogen at a relative humidity of about 98% for 6 minutes and then pure nitrogen at a relative humidity at which the experiment was to be performed for 10 minutes.

Most of the experiments were performed at a relative humidity of 54% with some experiments at 17% and 74%. At typical flue gas conditions, 17, 54, and 74% relative humidity corresponds to 38°, 9.5°, and 4.7° C. approach to saturation, respectively. Reactor temperature was 95°, 66°, and 64.4° C. for 17, 54, 74% relative humidity, respectively. Common purity (99.5%) nitrogen at 4.6 1/min (020 C., 1 atm) was used as a carrier gas. The nominal concentration of $SO_2$ was 500 ppm and exposure time of the sample to the sulfurized gas was 1 hour.

Preparation of the Samples

The sample preparation consisted of two essential steps: stirring and drying. In every experiment 0.4 of reagent grade $Ca(OH)_2$ was used. This amount of lime was slurried with fly ash or other additive at the desired weight ratio. The water to solids ratio was between 10:1 and 20:1—most often 15:1. A propeller stirrer at 350 rpm was used to agitate the slurry. Slurrying time varied from 2 to 24 hours and the temperature of the slurry was set at 25° to 92° C.

Two different methods of sample preparation was used during this study. In atmospheric drying, samples were not filtered after slurrying and were dried overnight in an atmospheric over at 85°-90° C. It took several hours to evaporate the water. The new drying procedure—vacuum drying—was introduced to minimize the additional reaction time of a wet sample in high oven temperature (85°-90° C.). In this method the samples were vacuum filtered (about 5 min) and subsequently vacuum dried (about 10 min) at 95° C. The time of vacuum filtering and drying depended on the fineness of the sample and was monitored by the thermocouple placed in the dried sample and connected to the temperature recorder. In this way the moment when all the free moisture was evaporated could be easily seen and vacuum drying stopped, therefore minimizing the residence time of the sample in the oven.

Characterization of the Samples

Four different fly ashes were slurried with $Ca(OH)_2$. The characterization of fly ashes is given in Table I. During the experiments on slurrying conditions, a new batch of fly ash IV was used. It was obtained from the same vendor and was produced by burning coal from, reportedly, the same source. These samples were characterized by scanning electron microscopy (SEM). The composition of the particles has been found using Kevex Micro-X 7000 X-ray Energy Spectrometer (XES). Mean particle size was determined using the Hiac-Royco particle counter.

TABLE I

| | Fly Ash Characterization | | | | |
|---|---|---|---|---|---|
| Fly Ash | I | II | III | IV | |
| Power Plant | Bull Run Plant TVA | Gibson Plant Public Service of Indiana | Seminole Electric Coop. Palatka, Fl | San Miguel Electric Coop. San Miguel, TX | |
| Coal Type | bituminous | bituminous | bituminous | lignite | |
| XES Analysis [weight %] | | | | | |
| CA | 34 | 5 | 4 | 11[1] | 15[2] |
| Si | 42 | 41 | 59 | 66 | 68 |
| Fe | 6 | 31 | 15 | 4 | 2 |
| Al | 16 | 20 | 20 | 18 | 14 |
| Mass Median Particle Size [μm] | 19 | 9 | 14 | 10 | 10 |

[1] Old Batch
[2] New Batch

The Effect of Fly Ash Type and Ratio

Four samples of fly ash were slurried with 0.4 g of lime at a fly ash loading of 4 (4 g fly ash/g $Ca(OH)_2$) for 4 hours at 65° C. and reacted at a relative humidity of 54% RH 54%). Atmospheric drying was used for the preparation of samples. The samples having the best and the worst performance at RH 54% were also tested at the extreme humidities of 17% and 74%. The results of these experiments are presented in FIG. 3. Also shown in FIG. 3 are the conversions when lime only was exposed to the sulfurized gas. As can be seen, all fly ashes improved the utilization at every RH investigated. Samples with fly ash loading of 16 (slurried at the same conditions as above) enhanced utilization of RH 54% to a greater extent than was the case for fly ash loading of 4. The utilization of lime was 67, 79, 65, 71% when fly ash I, II, III, IV was used, respectively. These values were much higher than the ones presented in FIG. 3. Based on these two series of experiments no correlation was found between $SO_2$ removed and calcium content of fly ash sample. SEM photographs of the mixtures of $Ca(OH)_2$ with fly ash II, III, and IV at fly ash loading of 4 demonstrated a highly irregular deposit covering the spherules of fly ash in every picture.

Fly ash I was selected to test the effect of fly ash loading on the utilization of lime. The results of experiments at RH 54% are presented in FIG. 4. The conversion of $Ca(OH)_2$ increased with increasing loading of fly ash. The increase of fly ash loading from 0.5 to 20 increased the $Ca(OH)_2$ utilization from 17 to 78%. An SEM photograph of fly ash I slurried with $Ca(OH)_2$ at the low loading of 0.5 demonstrated that the deposit is very slight and unreacted chunks of $Ca(OH)_2$ were seen next to fly ash particles.

The Effect of Reagent Grade Additives

Figure 5:
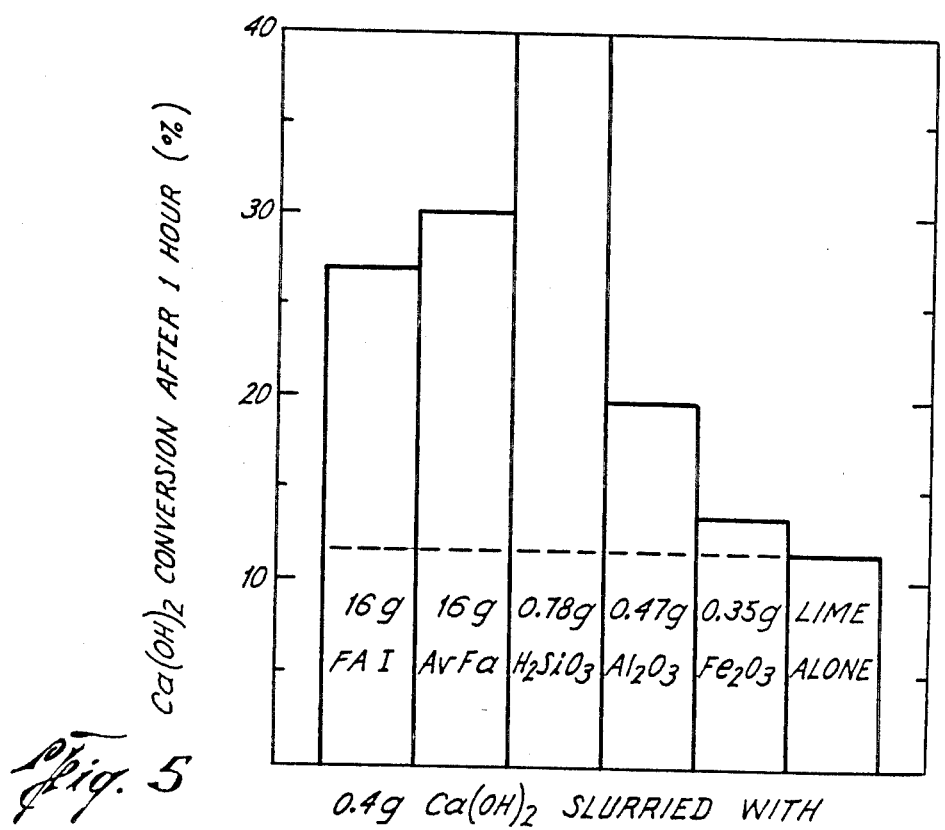
FIG. 5—A fly ash simulation experiment carried out at 54% RH. Samples of simulated fly ash (Av.Fa), $H_2SiO_3$, $Al_2O_3$, and $Fe_2O_3$ slurried with $Ca(OH)_2$ for 4 hours at 65° C. Atmospheic drying.

The other main components of fly ash were also investigated. Reagent grade $Al_2O_3$, $Fe_2O_3$, and $H_2SiO_3$ (silicic acid) were used as a source of alumina, iron, and silica, respectively. Fly ash was simulated as a mixture of three substances: 49% $H_2SiO_3$, 29% $Al_2O_3$, and 22% $Fe_2O_3$ (weight %). Atmospheric drying was used for the preparation of samples. The results are presented in FIG. 5, giving the conversion of $Ca(OH)_2$ at RH 54%. During these experiments $Ca(OH)_2$ was slurried with additives for 4 hours at 65° C. As can be seen from FIG. 5, 1.6 g of mixture slurried with 0.4 g of $Ca(OH)_2$ modelled closely the utilization when fly ash I was used (30 and 27%, respectively). This again implies that calcium content of fly ash is not of primary importance, since the utilization of added $Ca(OH)_2$ was even higher when no fly ashbound calcium was present. Next 0.4 g of $Ca(OH)_2$ was slurried separately with each component used to simulate the fly ash. Component loading was kept the same as it was when 1.6 g of mixture was used (i.e., 0.78 g, 0.47 g, and 0.35 g of $H_2SiO_3$, $Al_2O_3$, $Fe_2O_3$ were used, respectively).

Figure 4:
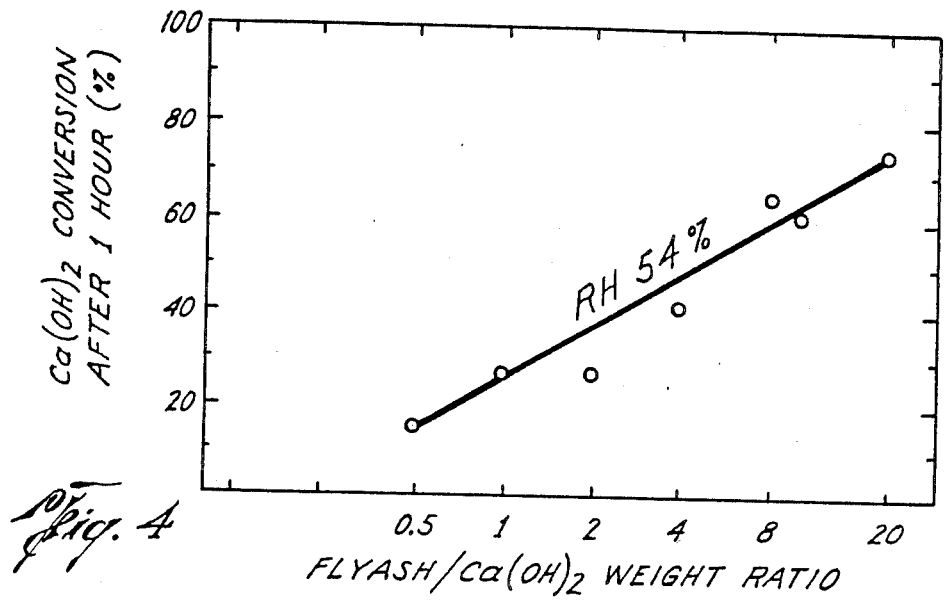
FIG. 4—The effect of fly ash I loading (g fly ash/g $Ca(OH)_2$) on lime utilization. Samples slurried for 4 hours at 65° C. Atmospheric drying.
Figure 6:
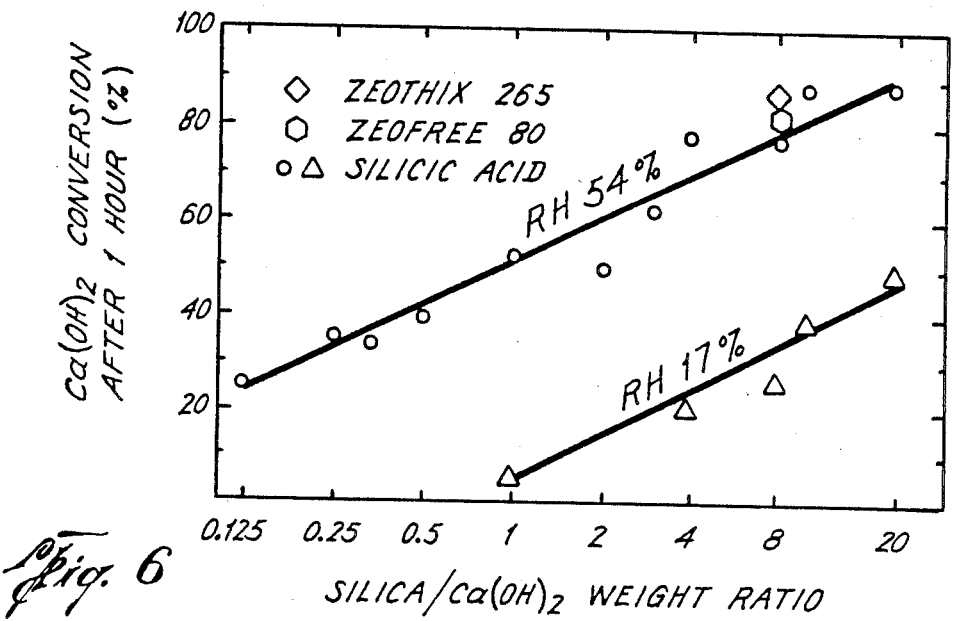
FIG. 6—The effect of silica ($H_2SiO_3$, Zeothix 265, or Zeofree 80) loading (g silica/g $Ca(OH)_2$) on time utilization. Atmospheric drying.

The addition of silicic acid had the most significant effect, increasing $Ca(OH)_2$ utilization from 12 to 40%. No $SO_2$ removal was observed when silicic acid alone was exposed to simulated flue gas. FIG. 6 gives the effect of silica loading on conversion at RH 17 and 54%. Silicic acid was used for most of these experiments. SEM photographs were taken of samples of silicic acid/$Ca(OH)_2$ slurried at 65° C. for 4 hours at silicic acid loading of 4 and 10, respectively. In both, highly developed surface of irregularly shaped particles were seen. Some experiments were performed with artificial precipitated silicas of extremely high surface areas. They were Zeothix 265 and Zeofree 80 of surface area 250 and 140 $m^2$/g, respectively (samples and surface area data obtained courtesy of Huber Corp.). However, these substances did not enhance $Ca(OH)_2$ utilization significantly better than silicic acid (FIG. 6). As can be seen from FIG. 6, both values of RH tested, $Ca(OH)_2$ utilization increased with the increasing loading of silicic acid. The comparison of the results presented in FIGS. 4 and 6 shows that silicic acid promotes $Ca(OH)_2$ utilization better than fly ash. For example, at RH 54% and fly ash loading of 8 (total fly ash) the conversion of $Ca(OH)_2$ was 78% when silicic acid was used and 61% when fly ash I was used.

Reactivities of fly ash and silicic acid should be compared on the basis of silica content. Assuming that fly ash I is 50% silica, a silicic acid loading of 8 should be compared to fly ash I loading of 16 (conversions of 78 and 68%). The difference between silicic acid and fly ash is more apparent at lower loadings. For silicic acid loading of 1, conversion was 53% and for the fly ash I loading of 2 it was 32%. This comparison shows that $Ca(OH)_2$ conversion depends on the reactivity of siliceous material used.

Experiments were performed at RH of 54% with pecipitated calcium silicate XP-974 (also from Huber Corp., surface area of 215 $m^2$/g, average particle size 6.1 um). The sample was taken "as received" and was not slurried. As SEM photograph of this sample showed the particle of calcium silicate as having an irregular surface area similar to that produced when silicic acid and Ca(OH)$_2$ were slurried.

Figure 7:
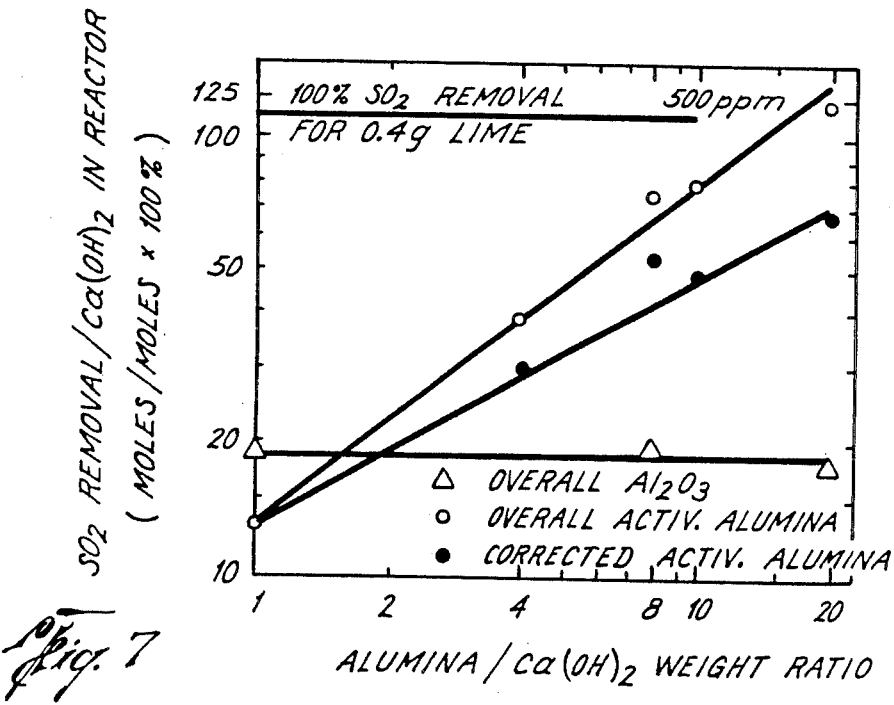
FIG. 7—The effect of alumina loading (g alumina/g $Ca(OH)_2$) on lime utilization. Atmospheric drying.

The effect of alumina loading was tested using two sources of alumina. The results of experiments at 54% RH are shown in FIG. 7. As can be seen, when reagent grade Al$_2$O$_3$ was used, increasing the loading did not change SO$_2$ removal. No SO$_2$ removal was aserved for Al$_2$O$_3$ alone. The removal increased with increasing loading of alumina when activated alumina of chromatographic grade (80–200 mesh) was used. However, activated alumina alone removed SO$_2$. The adsorptive capacity of activated alumina was calculated as 0.023 g of SO$_2$ per gram. Based on this value, the corrected SO$_2$ removal has been determined due o! to the possible formation of calcium aluminates. The empty points in FIG. 7 (○) represent the overall removal of SO$_2$ while the filled points (●) show the corrected values. These corrected values are lower than the ones observed for the same loading when silicic acid was used instead of alumina. Therefore, the silica content of fly ash is mainly responsible for the enhancement of Ca(OH)$_2$ utilization.

The Effect of Slurrying Conditions

Figure 8:
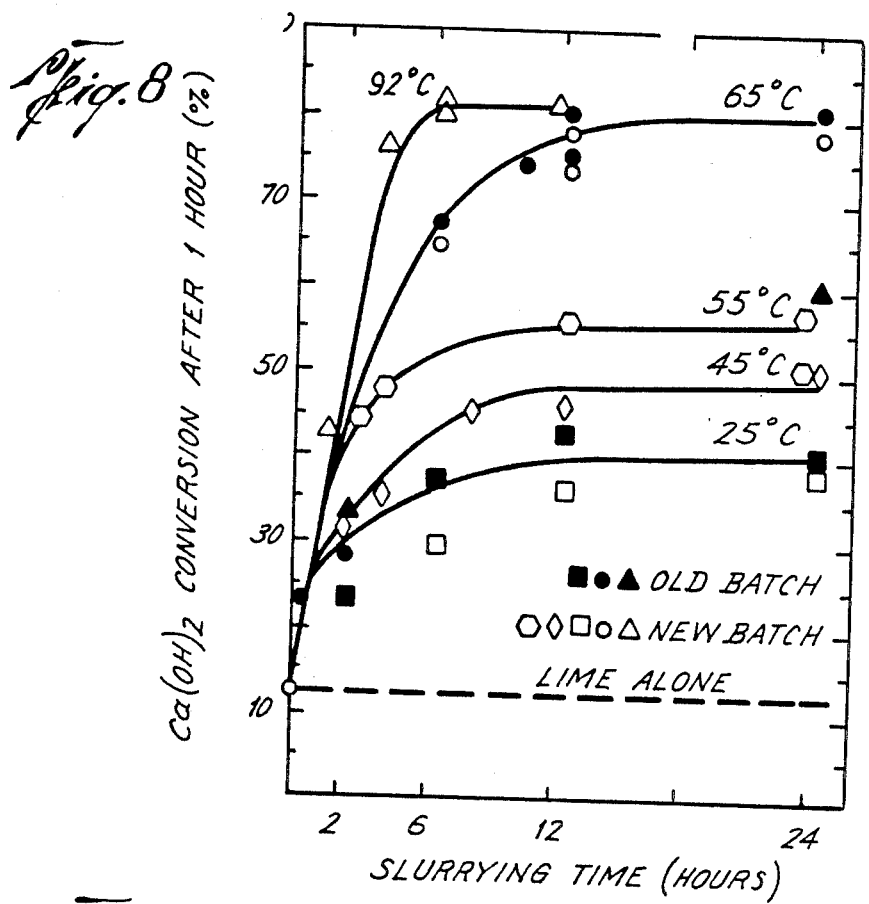
FIG. 8—The effect of fly ash IV on $Ca(OH)_2$ reactivity. Fly ash IV loading 16. Vacuum drying.

Slurrying tests were performed at 25°, 45°, 55°, 64°, and 92° C. and time was varied from 2 to 24 hours. The samples for these tests were prepared by vacuum filtration and vacuum drying. Both old and new batches of fly ash IV were used as a source of silica at 16 g fly ash/g Ca(OH)$_2$. Relative humidity during exposure was 54%. The results are presented in FIG. 8.

As can be seen, the temperature was the decisive parameter affecting the process. The results show that there is a critical slurrying time for every temperature tested after which Ca(OH)$_2$ conversion reaches a maximum value. Ca(OH)$_2$ conversion converged on 40% after 16 hours of slurrying at 25° C. and 80% after 5 hours at 92° C. It took 15 hours to converge on 80% conversion of Ca(OH)$_2$ when slurrying at 65° C. Compared with 12% utilization of Ca(OH)$_2$ alone at 54% RH, the 80% utilization of fly ash/Ca(OH)$_2$ slurried at 65° C. was dramatically improved.

Figure 9:
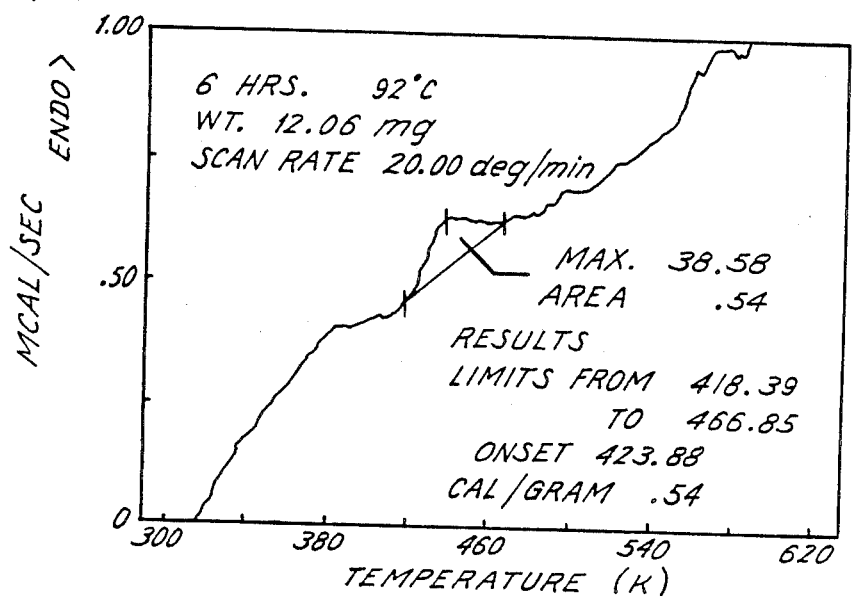
FIG. 9—DSC scan of a sample of 16 g fly ash IV/1 g $Ca(OH)_2$ slurried for 6 hours at 92° C. Vacuum drying.
Figure 10:
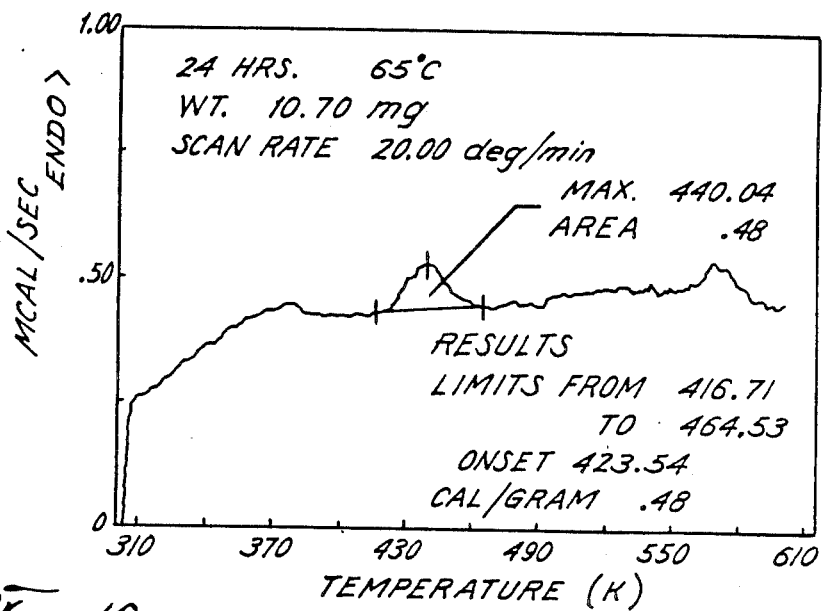
FIG. 10—DSC scan of a sample of 16 g fly ash IV/1 g $Ca(OH)_2$ slurred for 24 hours at 65° C. Vacuum drying.
Figure 11:
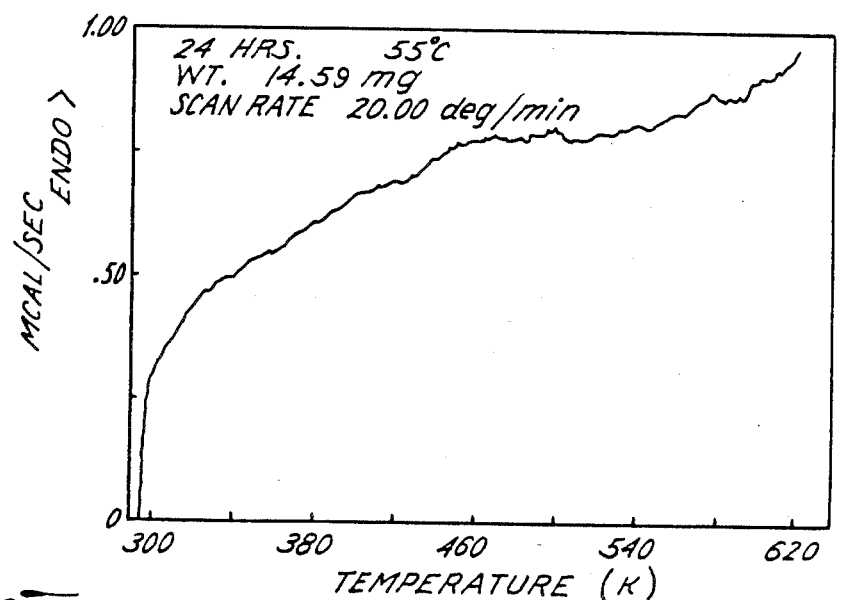
FIG. 11—DSC scan of a sample of 16 fly ash IV/1 g $Ca(OH)_2$ slurried for 24 hours at 55° C. Vacuum drying.

The maximum utilization of Ca(OH)$_2$ is not a uniform function of slurry temperature (40, 50, 55, 80, and 80%, for 25°, 45°, 55°, 65°, and 92° C., respectively). There appeared to be a discontinuity between 55° and 65° C. slurrying temperature that may indicate a change in the hydration state of the calcium aluminum silicate. The resulting solid had better reactivity for SO$_2$ removal than that formed below 65° C. When tested by Differential Scanning Calorimeter (DSC) the solids formed at 65° C. and 92° C. have an additional endothermic peak between 416 and 465 K. No peak was observed for samples slurried at 25°, 45° and 55° C. The DSC scans of the samples of fly ash IV/Ca(OH)$_2$ (at the weight ratioof 16:1) slurried at 92°, 65°, and 55° C. are shown in FIGS. 9, 10 and 11, respectively. The effect of a step change in reactivity also took place when fly ash III was slurried with Ca(OH)$_2$ at the fly ash loading of 16:1 at 65° and 45° C. The conversion of Ca(OH)$_2$ was 63 and 43%, respectively.

SEM photographs were taken to document the development of the surface area of the samples. In samples slurried for "0" time, separate fly ash spheres with smooth surfaces (as in an unslurried fly ash) and irregular particles of lime were seen. After 24 hours of slurrying at 25° C., the particles were covered with tiny deposits. The product on the surface of the fly ash became more densely precipitated after 24 hours of slurrying at 65° C. Increasing the temperature of slurrying to 92° C. resulted in a very well developed surface area of the deposit.

The Effect of Calcium Sulfite/Sulfate

Calcium sulfite or calcium sulfate were slurried with Ca(OH)$_2$ to simulate the recycle of spent lime. Laboratory produced calcium sulfite hemihydrate (90% CaSO$_3$12H$_2$O+10% CaSO$_4$) and reagent grade calcium sulfate dihydrate were used in these experiments. Vacuum drying was used for the preparation of the samples. Samples of fly ash IV/Ca(OH)$_2$/CaSO$_3$ at a weight ratio of 16:1:4 were slurried for 6 hours at 25°, 45°, and 65° C. The resulting conversions of Ca(OH)$_2$ were 41, 61, and 74%, respectively. Conversion of the fly ash-/Ca(OH)$_2$/CaSO$_3$ sample at a weight ratio of 16:1:4 slurried for 6 hours at 65° C. was higher than conversion o.f the corresponding fly ash/Ca(OH)$_2$ sample at a weight ratio of 20:1, which was 70%. Samples at a weight ratio of 16:1:1 were slurried for 6 hours at 25° and 65° C. and yielded Ca(OH)$_2$ conversions of 21 and 61%, respectively. SEM photographs of the fly ash IV/Ca(OH)$_2$/CaSO$_3$ samples at weight ratios of 16:1:4 and 16:1:1 demonstrated long crystals that may be calcium aluminate sulfate hydrates (ettringite) of general formula 3CaO Al$_2$ O$_3$ 3CaSO$_4$ xH$_2$O (x is most often within the range 30–32). These long crystals were not formed when only calcium sulfite was slurried with Ca(OH)$_2$ for 6 hours at 65° C. and at the weight ratio of 4:1 (Ca(OH)$_2$ conversion was 16%). Separate clusters of calcium sulfite and Ca(OH)$_2$ were visible by SEM. It may be that the formation of ettringite provides additional potential for SO$_2$ removal.

Two ratios of fly ash/Ca(OH)$_2$/calcium sulfate were tried. At a ratio of 16:1:4, Ca(OH)$_2$ conversion was 60% for samples slurried for 6 hours at both 25° and 65° C. At a lower ratio of 16:1:1, the conversion was 51 and 31% for samples slurried for 6 hours at 65° and 25° C., respectively. SEM photographs of the sample at a weight ratio of 16:1:4 slurried for 6 hours at 65° C. revealed fly ash speres with the precipitate on the surface, as well as calcium sulfate and long crystals (ettringite).

Both calcium sulfite and calcium sulfate improved the utilization of Ca(OH)$_2$ after slurrying the samples for 6 hours at 25° C. and a weight ratio of 16:1:4. However, at a fly ash/Ca(OH)$_2$/CaSO$_3$ ratio of 16:1:1, the conversion for samples slurried for 6 hours at 25° and 65° C. was lower than when fly ash was slurried at the same conditions with Ca(OH)$_2$ alone (21, 61, and 67%, respectively).

The Effect of Fly Ash Particle Size

Fly ash IV was wet-sieved into five fractions which are characterized in Table II. The fractionated fly ash was slurried with 0.4 g of Ca(OH)$_2$ at a loading of 16 for 6 hours at 65° C. Vacuum drying was used for the preparation of samples. The results of these experiments are shown in Table II. Also shown in Table II is the base case conversion of Ca(OH)$_2$ when it was slurried with fly ash IV ("natural"-whole spectrum of particle size). Calculated weighted average from obtained fractional conversions was 52%. The reason why the weighted average is lower than the base case (52 and 67%, respectively) may be that imperfect wet-sieving left fine particles agglomerated with coarse fractions. The general trend was that for the same fly ash loading, the conversion increased with the decreasing particle size of fly ash. An increase of the fly ash loading from 156 to 30 when the finest fraction of fly ash was used (d≦20 um) resulted in an increase of Ca(OH)$_2$ conversion from 76 to 92%. An increase of fly ash loading from 16 to 25 when coarser fraction was used (45um<d≦75 um) resulted in an increase of Ca(OH)$_2$ conversion from 42 to 52%.

TABLE II

Fractional Characterization of Fly Ash IV

| Fraction Ca(OH)$_2$ | Particle Diameter [um] | Weight Fraction [%] | Composition[1] Ca | Si | Conversion |
|---|---|---|---|---|---|
| 1 | d ≦ 1251 | 15 | 12 | 63 | 24 |
| 2 | 75 < d ≦ 125 | 13 | 8 | 55 | 28 |
| 3 | 45 < d ≦ 75 | 20 | 9 | 60 | 43 |
| 4 | 20 < d ≦ 45 | 12 | 14 | 67 | 50 |
| 5 | d ≦ 20 | 40[2] | 14 | 63 | 77 |
| 6 | 0 < d ≦ 125+ | 100 | 15 | 68 | 67 |

[1]Weight percent, normalized Energy Dispersion Spectrometry results.
[2]All losses during wet-sieving assumed for the finest fraction.

Alternate Sources of Silica

Several alternative sources of silica were tested. These included siliceous clays (kaolinite and bentonite) and talc (MgO 4SiOSO$_2$ H$_2$O). Kaolinite of the molecular composition Al$_2$O$_3$ 2SiO$_2$ 2H$_2$O is the principal constituent of kaolin and the most frequently occurring component of clays. Bentonite (montmorillonite clay) of general formula Al$_2$O$_3$ 4SiO$_2$ H$_2$O exists as very fine particles (up to 60% below 0.1 um), which form colloidal solutions with water. Montmorillonite No. 24 (Ward's Classification) was tested. All samples were slurried for 6 hours at 65° C. at clay loading of 2. Montmorillonite was also tested at loading of 16. The conversions of Ca(OH)$_2$ were 39, 25, and 23% for montmorillonite, kaolinite, and talc, respectively (at loading of 2). At similar slurrying conditions and loading of 2, fly ash I promoted Ca(OH)$_2$ utilization to 28% (fly ash I slurried at 65° C. for 4 hours only). At montmorillonite loading of 16, it increased the conversion to 61%, which was slightly less than fly ash I and fly ash IV. An SEM photograph was taken of the sample of montmorillonite clay No. 24 slurried with reagent grade Ca(OH)$_2$ at loading of 16 for 6 hours at 65° C. The highly irregular particle surface which was observed was reminiscent of the appearance of silicic acid/Ca(OH)$_2$ samples and of the deposit on the surface of the fly ash spheres.

In conclusion, enhanced performance of spray dryer/bag filter systems with recycle of fly ash an calcium solids is probably due to the reaction of Ca(OH)$_2$ with fly ash to produce calcium silicates. The calcium silicate solids were found to have greater surface area than the unreacted Ca(OH)$_2$ and are more effective for gas/solid reactions. Moreover, calcium silicates were found to be more reactive than aluminates or ferrites. The available silica content of the fly ash is more important. Increased time and temperature gave more reactive solids from the reaction of lime and fly ash and solids formed above 65° were substantially more reactive than solids formed at lower temperatures.

The following is a compilation of experiments performed using the lab-scale system described in the foregoing example. Whenever "lime" is mentioned, it refers to reagent grade Ca(OH)$_2$. All slurries were agitated with a propeller blade stirrer set at approximately 350 rmp unless otherwise designated.

DESCRIPTION OF EXPERIMENTS

Exp. 1. 2 g of fly ash slurried with 0.5 g lime at room temperature for 1 hour. 10 ml of H$_2$O used. Dried overnight at 85° C. Conversion of 51%.

Exp. 2. 2g of cement slurried at 10 ml of H$_2$O for 1 hour. Dried overnight at 85° C. Conversion of 10%.

Exp. 3. First simulated fly ash produced (9.88 g H$_2$SiO$_3$, 5.76 g Al$_2$O$_3$, 4.36 g Fe$_2$O$_3$ slurried with 100 ml of H$_2$O at room temperature for 0.5 hour, dried overnight at 85° C). 2 g of this simulated fly ash mixed with 0.5 g of lime (without slurrying). Conversion of 25%.

Exp. 4. 0.5 g of lime slurried at room temperature for 0.5 hours, next 2 g of simulated fly ash added and slurried at 65°-70° C. for 8 hours. Dried overnight at 85° C. Conversion of 57%.

Exp. 5. 0.8 g of lime slurried at room temperature for 0.5 hour. Later 1.56 g of H$_2$SiO$_3$ added and slurried at 65°-70° C. for 8 hours. Dried overnight at 85° C. Conversion of 50%.

Exp. 6. 0.5 g of lime slurried at room temperature for 0.5 hour. Later 2 g of simulated fly ash added and slurried for 4 hours at elevated temperature (temperature 65°-70° C.=elevated temperature). Dried overnight at 85° C. Conversion of 58%.

Exp. 7. 4 g of cement slurried slurried at elevated temperature for 4 hours. Dried overnight at 85° C. Conversion of 20%.

Exp. 8. 6 g of cement and 0.12 g of CaCl$_2$ slurried at elevated temperature for 4 hours. Dried overnight at 85° C. Conversion of 25%.

Exp. 9. 1.2 g of lime and 1.4 g of Al$_2$O$_3$ slurried at elevated temperature for 8 hours. Dried overnight at 85° C. Conversion of 61%.

Exp. 10. 1.6 g of lime and 3.14 g of silica sand (100 mesh) slurried at elevated temperature for 4 hours. Dried overnight at 85° C. Conversion of 32%.

Exp. 11. 0.5 g of lime and 2 g of fly ash I slurried at elevated temperature for 4 hours. Dried overnight at 85° C. Conversion of 53%.

Exp. 12. 3.6 g of lime and 4.2 Al$_2$O$_3$ slurried at elevated temperature for 8 hours. Dried overnight at 85° C. Conversion of 31%.

Exp. 13. 2 g of lime and 8 g of fly ash II slurried at elevated temperature for 4 hours. Dried overnight at ° C. Conversion of 31%.

Exp. 14. Experiment 5 repeated. Conversion of 12%.

Exp. 15. 3 g of lime and 12 g of fly ash II slurried at elevated temperature for 4 hours. Dried overnight at ° C. Conversion of 10%.

Exp. 16. 2 g of lime and 1.76 g of Fe$_2$O$_3$ slurried at elevated temperature for 4 hours. Dried overnight at 85° C. Conversion of 10%.

Exp. 17. 3 g of lime and 12 g of fly ash I slurried at elevated temperature for 4 hours. Dried overnight at 85° C. Conversion of 6%.

Exp. 18. 4 g of lime and 7.84 g of H$_2$SiO$_3$ slurried at elevated temperature for 8 hours. Dried overnight at 85° C. Conversion of 40%.

Exp. 19. Experiment 17 repeated. Conversion of 27%.

Exp. 20. 0.87 g of sample from experiment 12. Conversion of 20%.

Exp. 21. 2 g of sample from experiment 13. Conversion of 8%.

Exp. 22. 8 g of lime and 32 g of fly ash III slurried at elevated temperature for 4 hours. Dried overnight at 85° C. Conversion of 22%.

Exp. 23. 0.75 g of sample from experiment 16. Conversion of 14%.

Exp. 24. 4 g of lime and 2 g of fly ash I slurried at elevated temperature for 4 hours. Dried overnight at 85° C. Conversion of 17%.

Exp. 25. 4 g of lime and 2 g of $H_2SiO_3$ slurried at elevated temperature for 4 hours. Dried overnight at 85° C. Conversion of 40%.

Exp. 26. 4 g of lime and 2 g of $Al_2O_3$ slurried at elevated temperature for 4 hours. Dried overnight at 85° C. Conversion of 34%.

Exp. 27. 4 g of lime and 4 g of fly ash II slurried at elevated temperature for 4 hours. Dried overnight at 85° C. Conversion of 24%.

Exp. 28. 4 g of of lime and 4 g of fly ash III slurried at elevated temperature for 4 hours. Dried overnight at 85° C. Conversion of 18%.

Exp. 29. 4 g of lime and 1 g of $H_2SiO_3$ slurried at elevated temperature for 4 hours. Dried overnight at 85° C. Conversion of 35%.

Exp. 30. 5 g of $H_2SiO_3$ slurried at elevated temperature for 4 hours. Dried overnight at 85° C. No removal.

Exp. 31. 4 g of lime and 16 g of of fly ash IV slurried at elevated temperature for 4 hours. Dried overnight at 85° C. Conversion of 24%.

Exp. 32. 4 g of lime and 16 g of fly ash IV slurried at elevated temperature for 1 hour. Dried overnight at 85° C. Conversion of 19%.

Exp. 33. 4 g of lime and 0.5 g of $H_2SiO_3$ slurried at elevated temperature for 4 hours. Dried overnight at 85° C. Conversion of 26%.

Exp. 34. 3.6 g of lime and 4.2 g of $Al_2O_3$ slurried at elevated temperature for 4 hours. Dried overnight at 85° C. Conversion of 28%.

Exp. 35. 4 g of lime and 7.84 g of $H_2SiO_3$ slurried at elevated temperature for 4 hours. Dried overnight at 85° C. Conversion of 50%.

Exp. 36. 3 g of lime and 1 g of $H_2SiO_3$ slurried at elevated temperature for 4 hours. Dried overnight at 85° C. Conversion of 32%.

Exp. 37. 4 g of lime and 4 g of $H_2SiO_3$ slurried at elevated temperature for 4 hours. Dried overnight at 85° C. Conversion of 53%.

Exp. 38. 4 g of lime and 16 g of $H_2SiO_3$ slurried at elevated temperature for 4 hours. Dried overnight at 85° C. Conversion of 80%.

Exp. 39. 4 g of lime and 12 g of $H_2SiO_3$ slurried at elevated temperature for 4 hours. Dried overnight at 85° C. Conversion of 62%.

Exp. 40. 2 g of lime and 16 g of $H_2SiO_3$ slurried at elevated temperature for 4 hours. Dried overnight at 85° C. Conversion of 78%.

Exp. 41. 2 g of lime and 20 g of $H_2SiO_3$ slurried at elevated temperature for 4 hours. Dried overnight at 85° C. Conversion of 88%.

Exp. 42. 2 g of lime and 16.3 fly ash I slurried at elevated temperature for 4 hours. Dried overnight at 85° C. Conversion of 42%.

Exp. 43. 4 g of lime and 16 g of sand slurried at elevated temperature for 4 hours. Dried overnight at 85° C. No removal.

Exp. 44. 4 g of lime and 16 g of $H_2SiO_3$ slurried at elevated temperature for 4 hours. Dried overnight at 85° C. Conversion of 76%.

Exp. 45. 1 g of lime and 20 g of $H_2SiO_3$ slurried at elevated temperature for 4 hours. Dried overnight at 85° C. Conversion of 89%.

Exp. 46. 0.4 g of XP-974 (artificial calcium silicate from Huber Corp.) not slurried. Conversion of 72%.

Exp. 47. 1 g of lime and 16.3 g of fly ash I slurried at elevated temperature for 4 hours. Dried overnight at 85° C. Conversion of 67%.

Exp. 48. 0.45 g of lime and 18.34g of fly ash I slurried at elevated temperature for 4 hours. Dried overnight at 85° C. Conversion of 75%.

Exp. 49. 0.5 g lime and 2 g of simulated fly ash slurried at elevated temperature for 4 hours. Dried overnight at 85° C. Conversion of 69%.

Exp. 50. The newly prepared batch at the same composition and loading as in experiment 48. Leak.

Exp. 51. 0.8 g of XP-974—without slurrying. Conversion of 73%.

Exp. 52. 1.2 g of XP-974—without slurrying. Conversion of 73%.

Exp. 53. 0.8 g lime and 8 g of ZEOTHIX 265 (precipitated silica from Huber Corp.) slurried at elevated temperature for 4 hours. Dried overnight at 85° C. Conversion of 83%.

Exp. 54. 0.8 g lime and 8 g of ZEOFREE 80 (precipitated silica from Huber Corp.) slurried at elevated temperature for 4 hours. Dried overnight at 85° C. Conversion of 82%.

Exp. 55. 0.8g lime and 8 g of ZEOLEX 7 (sodium aluminum silicate from Huber Corp.) slurried at elevated temperature for 4 hours. Dried overnight at 85° C. Conversion of 79%.

Exp. 56. 1.49 g of ZEOLEX 7. No removal.

Exp. 57. 0.8 g of lime and 13.04 g of fly ash II slurried at elevated temperature for 4 hours. Dried overnight at 85° C. Conversion of 79%.

Exp. 58. 0.8 g of lime and 13.04 g of fly ash III slurried at elevated temperature for 4 hours. Dried overnight at 85° C. Conversion of 65%.

Exp. 59. 1 g of lime and 16.3 g of fly ash IV slurried at elevated temperature for 4 hours. Dried overnight at 85° C. Conversion of 71%.

Exp. 60. 0.8 g of XP-974. Conversion of 44%.

Exp. 61. 0.6 g of sample from experiment 24. Conversion of 33%.

Exp. 62. 4.4 g of sample from experiment 41. Leak.

Exp. 63. 8.4 g of sample from experiment 45. Conversion of 53%.

Exp. 64. 1 g of lime and 8 g of $Al_2O_3$ (activated alumina) slurried at elevated temperature for 4 hours. Dried overnight at 85° C. Conversion of 77%.

Exp. 65. 0.5 g of lime and 8.15 g of fly ash IV slurried at 100° C. for 2 hours. Dried overnight at 85° C. Conversion of 18%.

Exp. 66. 3.6 g of sample from experiment 40. Conversion of 26%.

Exp. 67. 3.6 g of sample from experiment 64. Conversion of 42%.

Exp. 68. 6.92 g of sample from experiment 65. Conversion of 21%.

Exp. 69. 6.92 g of sample from experiment 59. Conversion of 20%.

Exp. 70. 6.92 g of sample from experiment 47. Conversion of 11%.

Exp. 71. 2 g of sample from experiment 38. Conversion of 23%.

Exp. 72. 0.8 g of sample from experiment 37. Conversion of 6%.

Exp. 73. 1.7 g of lime and 34 g of activated alumina slurried at elevated temperature for 4 hours. Dried overnight at 85° C.

Exp. 74. 1.7 g of lime and 17 g of activated alumina slurried at elevated temperature for 4 hours. Dried overnight at 85° C. Conversion of 79%.

Exp. 75. 1.7 g of lime and 6.8 g of activated alumina slurried at elevated temperature for 4 hours. Dried overnight at 85° C. Conversion of 39%.

Exp. 76. 3 g of $CaCo_3$ and 33.6 g of $H_2SiO_3$ slurried at elevated temperature for 4 hours. Dried overnight at 85° C. Conversion of 37%.

Exp. 77. 2 g of lime and 32.6 g of fly ash IV slurried at elevated temperature for 28 hours. Dried overnight at 85° C. Conversion of 47%.

Exp. 78. 6.3 g of sample from experiment 73.

Exp. 79. 6.3 g of sample from experiment 73. Conversion of 56%.

Exp. 80. 2 g of lime and 32.6 g of fly ash IV slurried at elevated temperature for 28 hours. Dried overnight at 85° C. Conversion of 53%.

Exp. 81. 2.5 g of lime and 2.5 g of $Al_2O_3$ (activated alumina) slurried at elevated temperature for 4 hours. Dried overnight at 85° C. Conversion of 13%.

Exp. 82. 2 g of lime and 0.5 g of $Al_2O_3$ (activated alumina) slurried at elevated temperature for 4 hours. Dried overnight at 85° C. Conversion of 12%.

Exp. 83. 2 g of lime and 0.25 g of $Al_2O_3$ (activated alumina) slurried at elevated temperature for 4 hours. Dried overnight at 85° C. Conversion of 15%.

Exp. 84. 2 g of lime and 32.6 g of fly ash IV slurried at 100° C. for 8 hours. Dried overnight at 85° C. Conversion of 73%.

Exp. 85. 1.7 g of lime and 34 g of $Al_2O_3$ (activated alumina) slurried at elevated temperature for 4 hours. Dried overnight at 85° C. Conversion of 35%.

Exp. 86. 32.6 g of fly ash IV slurried at elevated temperature for 24 hours. 2 g of lime added and slurried for additional 4 hours (same temperature). Dried overnight at 85° C. Conversion of 89%.

Exp. 87. 80 g of $Al_2O_3$ (activated alumina) slurried at elevated temperature for 4 hours. Dried overnight at 85° C. Conversion of 42%.

Exp. 88. 0.9 g of lime and 14.67 g of fly ash IV slurried at 65° C. for 2 hours. Dried overnight at 85° C. Conversion of 62%.

Exp. 89. 0.9 g of lime and 14.67 g of fly ash IV slurried at 25° C. for 28 hours. Dried overnight at 85° C. Conversion of 54%.

Exp. 90. 0.9 g of lime and 14.67 g of fly ash IV slurried at 25° C. for 4 hours. Dried overnight at 85° C. Conversion of 67%.

Exp. 91. 6.92 g of sample from experiment 86. Conversion of 34%.

Exp. 92. 0.9 g of lime slurried with 14.67 g of fly ash IV at 25° C. for 2 hours. Dried overnight at 85° C. Conversion of 57%.

Exp. 93. 20 g of $Al_2O_3$ (reagent grade) slurried at elevated temperature for 4 hours. Dried overnight at 85° C. Removal of 6%.

Exp. 94. 14.67 g of fly ash IV slurried at 65° C. for 45.5 hours. Later 0.9 g of lime added and slurried for additional 4 hours (same temperature). Dried overnight at 85° C. Conversion of 58%.

Exp. 95. 6.92 g of sample from experiment 80. Conversion of 26%.

Exp. 96. 14.67 g of fly ash IV slurried at 25° C. for 24 hours. Later 0.9 g of lime added and slurried for additional 4 hours (same temperature). Dried overnight at 85° C. Conversion of 63%.

Exp. 97. 16 g of $Al_2O_3$ (reagent grade) and 2 g of lime slurried at elevated temperature for 4 hours. Dried overnight at 85° C. Conversion of 20%.

Exp. 98. 40 g of $Al_2O_3$ (reagent grade) and 2 g of lime slurried at elevated temperature for 4 hours. Dried overnight at 85° C. Conversion of 18%.

Exp. 99. 8.15 g of fly ash IV slurried at 25° C. for 24 hours (26 hours to be exact. Later 0.5 g of lime added and slurried for additional 1 hour (same temperature)). Dried overnight at 85° C. Conversion of 59%.

Exp. 100. 8.15 g of fly ash IV slurried at 25° C. for 4 hours in 0.01N NaOH (100 $cm^3$ of distilled water, 10 $cm^3$ of 0.1N NaOHO. Later 0.5 g of lime added and slurried for additional 1 hour (same temperature). Dried overnight at 85° C. Conversion of 67%.

Exp. 101. 8.15 g of fly ash IV and 0.5 g of lime mixed together in 100 $cm^3$ of distilled water for a moment (ca. 1 min.). Dried overnight at 85° C. Conversion of 50%.

Exp. 102. 8.15 g of fly ash IV slurried at 25° C. for 24 hours in 0.01N NaOH. Later 0.5 g of lime added and slurried for additional 1 hour (same temperature). Dried overnight at 85° C.

Exp. 103. 8.15 g of fly ash IV mixed with 0.5 g of lime for 1 min. Vacuum filtered and vacuum dried at 105° C. Conversion of 23%.

Beginning with experiment 104, all samples were vacuum filtered and vacuum dried at 95° C. Vacuum filtering takes about 5 minutes; vacuum drying takes between 15 and 25 minutes, depending on fineness of slurried solids and quality of vacuum drying.

Exp. 104. 8.15 g of fly ash IV slurried at 25° C. for 8 hours in 100 $cm^3$ of 0.1N NaOH. Later 0.5 g of lime added and slurried for additional 1 hour (same temperature). Conversion of 34%.

Exp. 105. 8.15 g of fly ash IV slurried with 0.5 g of lime at 25° C. for 2 hours. Conversion of 23%.

Exp. 106. 8.15 g of fly ash IV slurried with 0.5 g of lime at 65° C. for 2 hours. Conversion of 27%.

Exp. 107. 8.15 g of fly ash IV slurried with 0.5 g of lime at 92° C. for 2 hours. Conversion of 55%.

Exp. 108. 8.15 g of fly ash IV and 0.5 g of lime slurried in 100 $cm^3$ of 1N NaOH at 25° C. for 2 hours. Conversion of 28%.

Exp. 109. 8.15 g of fly ash IV slurried with 0.5 g of lime at 92° C. for 6 hours. Conversion of 41%.

Exp. 110. 8.15 g of fly ash IV slurried with 0.5 g of lime at 25° C. for 24 hours. Conversion of 40%.

Exp. 111. 8.15 g of fly ash IV slurried with 0.5 g of lime at 92° C. for 6 hours (without agitation). Conversion of 57%.

Exp 112. 8.15 g of fly ash IV slurried with 0.5 g of lime at 92° C. for 5 hours (without agitation). Later cured for 46 hours at room temperature. Conversion of 54%.

Exp. 113. 8.15 g of fly ash IV slurried with 0.5 g of lime at 65° C. for 6 hours. Conversion of 47%.

Exp. 114. 8.15 g of fly ash IV slurried with 0.5 g of lime at 65° C. for 6 hours (without agitation). Conversion of 46%.

Exp. 115. 8.15 g of fly ash IV slurried with 0.5 g of lime at 65° C. for 24 hours. Conversion of 76%.

Exp. 116. 8.15 g of fly ash IV slurried with 0.5 g of lime at 92° C. for 24 hours. Conversion of 67%.

Exp. 117. 8.15 g of fly ash IV slurried with 0.5 g of lime at 25° C. for 12 hours. Conversion of 43%.

Exp. 118. 8.15 g of fly ash IV slurried with 0.5 g of lime at 65° C. for 12 hours. Conversion of 75%.

Exp. 119. 8.15 g of fly ash IV slurried with 0.5 g of lime at 25° C. for 6 hours. Conversion of 37%.

Exp. 120. 8.15 g of fly ash IV slurried with 0.5 g of lime at ° 65° C. for 12 hours. Conversion of 63%.

Exp. 121. 8.15 g of fly ash IV slurried with 0.5 g of lime at 25° C. for 24 hours (without agitation). Conversion of 38%.

Exp. 122. 8.15 g of fly ash IV slurried with 0.5 g of lime at 65° C. for 10 hours. Conversion of 59%.

Beginning with experiment 118A a new batch of San Miguel fly ash (fly ash IV) was used.

Exp. 118A. 8.15 g of fly ash IV slurried with 0.5 g of lime at 65° C. for 12 hours. Conversion of 62%.

Exp. 122A. 8.15 g of fly ash IV slurried with 0.5 g of lime at 65° C. for 10 hours. Conversion of 74%.

Exp. 118B. 8.15 g of fly ash IV slurried with 0.5 g of lime at 65° C. for 12 hours. Conversion of 80%.

Exp. 118C. 8.15 g of fly ash IV slurried with 0.5 g of lime at 65° C. for 12 hours. Conversion of 74%.

Exp. 109A. 8.15 g of fly ash IV slurried with 0.5 g of lime at 92° C. for 6 hours. Conversion of 82%.

Exp. 115A. 8.15 g of fly ash IV slurried with 0.5 g of lime at 65° C. for 24 hours. Conversion of 81%.

Exp. 110A. 8.15 g of fly ash IV slurried with 0.5 g of lime at 25° C. for 24 hours. Conversion of 38%.

Exp. 113A. 8.15 g of fly ash IV slurried with 0.5 g of lime at 65° C. for 6 hours. Conversion of 67%.

Exp. 120A. 8.15 g of fly ash IV slurried with 0.5 g of lime at 92° C. for 12 hours. Conversion of 63%.

Exp. 119A. 8.15 g of fly ash IV slurried with 0.5 g of lime at 25° C. for 6 hours. Conversion of 29%.

Exp. 117A. 8.15 g of fly ash IV slurried with 0.5 g of lime at 25° C. for 12 hours. Conversion of 36%.

Exp. 109B. 8.15 g of fly ash IV slurried with 0.5 g of lime at 92° C. for 6 hours. Conversion of 81%.

Exp. 106A. 8.15 g of fly ash IV slurried with 0.5 g of lime at 65° C. for 2 hours. Conversion of 48%.

Exp. 123. 8.15 g of fly ash IV slurried with 0.5 g of lime at 65° C. for 4 hours. Conversion of 57%.

Exp. 107A. 8.15 g of fly ash IV slurried with 0.5 g of lime at 92° C. for 2 hours. Conversion of 42%.

Exp. 125. 8.15 g of fly ash IV slurried with 0.5 g of lime at 45° C. for 4 hours. Conversion of 35%.

Exp. 126. 8.15 g of fly ash IV slurried with 0.5 g of lime at 45° C. for 8 hours. Conversion of 46%.

Exp. 127. 8.15 g of fly ash IV slurried with 0.5 g of lime at 45° C. for 12 hours. Conversion of 47%.

Exp. 128. 8.15 g of fly ash IV slurried with 0.5 g of lime at 45° C. for 24 hours. Conversion of 42%.

Exp. 129. 8.15 g of fly ash IV slurried with 0.5 g of lime at 55° C. for 2 hours. Conversion of 45%.

Exp. 130. 8.15 g of fly ash IV slurried with 0.5 g of lime at 55° C. for 4 hours. Conversion of 49%.

Exp. 131. 8.15 g of fly ash IV slurried with 0.5 g of lime at 55° C. for 24 hours. Conversion of 52%.

Exp. 113B. 8.15 g of fly ash IV slurried with 0.5 g of lime at 65° C. for 24 hours. Conversion of 64%.

Exp. 132. 8.15 g of fly ash IV slurried with 0.5 g of Western High Calcium Pressure Hydrated Lime (from Acurex Corp.) at 65° C. for 6 hours. Conversion of 65%.

Exp. 133. 8.15 g of fly ash IV slurried with 0.5 g of Pressure Hydrated Dolomitic Lime (before ball mill; also from Acurex Corp.) at 65° C. for 6 hours. Conversion of 57%.

Exp. 134. 8.15 g of fly ash IV slurried with 0.5 g of lime and with 2 g of calcium sulfite iodometric titration—92% $CaSO_3$+8% $CaSO_4$) at 65° C. for 6 hours. Conversion of 74%.

Exp. 135. 8.15 g of fly ash IV slurried with 0.5 g of lime and with 0.5 g of calcium sulfite (as in exp. 134) at 65° C. for 6 hours. Conversion of 61%.

Exp. 136. 2 g of fly ash IV slurried with 1 g of lime at 65° C. for 6 hours. Conversion of 41%.

Exp. 137. 2 g of fly ash IV slurried with 1 g of lime at 25° C. for 6 hours. Conversion of 37%.

Exp. 138. 8.15 g of fly ash IV slurried with 0.5 g of lime and with 2 g of calcium sulfite (as in exp. 134) at 45° C. for 6 hours. Conversion of 79%.

Exp. 139. 8.15 g of fly ash IV slurried with 0.5 g of lime and with 2 g of calcium sulfite (as in exp. 135) at 25° C. for 6 hours. Conversion of 61%.

Exp. 140. 8.16g of fly ash IV (fraction passing 20 $\mu$m wet sieve only) slurried with 0.5 g of lime at 65° C. for 6 hours. Conversion of 76%.

Exp. 141. 8.15 g of fly ash IV (Fraction remaining on 125 $\mu$m wet sieve only) slurried with 0.5 g of lime at 65° C. for 6 hours. Conversion of 24%.

Exp. 142. 8.15 g of fly ash IV (fraction remaining on 45 $\mu$m wet sieve only) slurried with 0.5 g of lime at 65° C. for 6 hours. Conversion of 49%.

Exp. 143. 8.15 g of fly ash IV (fraction remaining on 20 $\mu$m wet sieve only) slurried with 0.5 g of lime at 65° C. for 6 hours. Conversion of 42%.

Exp. 144. 8.15 g of fly ash IV (fraction remaining on 75 $\mu$m wet sieve only) slurried with 0.5 g of lime at 65° C. for 6 hours. Conversion of 27%.

Exp. 145. 11 g of fly ash IV (fraction remaining on 45 $\mu$m wet sieve only) slurried with 0.45 g of lime at 65° C. for 6 hours. Conversion of 52%.

Exp. 146. 12.6 g of fly ash IV (fraction passing 20 $\mu$m wet sieve only) slurried with 0.42 g of lime at 65° C. for 6 hours. Conversion of 92% (leak).

Exp. 147. 8 g of fly ash III slurried with 0.5 g of lime at 65° C. for 6 hours. Conversion of 63%.

Exp. 148. 2 g of fly ash III slurried with 0.5 g of lime at 65° C. for 6 hours. Conversion of 22%.

Exp. 149. 8 g of fly ash III slurried with 0.5 g of lime at 45° C. for 6 hours. Conversion of 43%.

Exp. 150. 2 g of fly ash III slurried with 0.5 g of lime a 65° C. for 6 hours. Conversion of 28%.

Exp. 148A. 2g of fly ash III slurried with 0.5 g of lime at 65° C. for 6 hours. Conversion of 38%.

Exp. 151. 8.15 g of fly ash IV slurried with 0.5 g of lime at 60° C. for 6 hours. Conversion of 51%.

Exp. 152. 8.15 g of fly ash IV slurried with 0.5 g of lime at 58° C. for 6 hours. Conversion of 53%.

Exp. 153. 8.15 g of fly ash IV slurried with 0.5 g of lime at 63° C. for 6 hours. Conversion of 59%.

Exp. 154. 8.15 g of fly ash IV slurried with 0.5 g of lime and with 2 g of calcium sulfite (as in exp. 134) at 25° C. for 6 hours. Conversion of 36%.

Exp. 155. 8.15 g of fly ash IV slurried with 0.5 g of lime and with 2 g of calcium sulfate (reagent grade $CaSO_4 \times 2H_2O$) at 65° C. for 6 hours. Conversion of 60%.

Exp. 156. 8.15 g of fly ash IV slurried with 0.5 g of lime and with 2 g of calcium sulfate (reagent grade $CaSO_4 \times 2H_2O$) at 25° C. for 6 hours. Conversion of 60%.

Exp. 157. 0.5 g of lime slurried with 2 g of $CaSO_3$ at 65° C. for 6 hours. Conversion of 16%.

Exp. 158. 8.15 g of fly ash IV and 0.5 g of lime and 0.5 g of $CaSO_4$ slurried at 65° C. for 6 hours. Conversion of 51%.

Exp. 159. 8.15 g of fly ash IV and 0.5 g of lime and 0.5 g of CaSO$_4$ slurried at 25° C. for 6 hours. Conversion of 31%.

Exp. 160. 8.15 g of montmorillonite #24 and 0.5 g of lime slurried at 65° C. for 6 hours. Conversion of 61%.

Exp. 161. 8.15 g of fly ash and 0.5 g of lime and 0.5 g of CaSO$_3$ slurried at 65° C. for 6 hours. Conversion of 21%.

Exp. 162. 10 g of fly ash IV and 0.5 g of lime slurried 65° C. for 6 hours. Conversion of 38%.

Exp. 163. 4 g of montmorillonite #24 and 2 g of lime slurried at 65° C. for 6 hours. Conversion of 39%.

Exp. 164. 4 g of kaolinite and 2 g of lime slurried at 65° C. for 6 hours. Conversion of 24%.

Exp. 165. 2 g of talc (magnesium silicate) and 1 g of lime slurried at 65° C. for 6 hours. Conversion of 23%.

Exp. 166. 0.5 g of lime and 8.15 g of fly ash IV and 2 cm$^3$ of CaCl$_2 \times$ 2H$_2$O (4% molar) slurried at 65° C. for 6 hours. Conversion of 31%.

Exp. 167. 0.5 g of lime and 8 g of montmorillonite #31 slurried at 65° C. for 6 hours. Conversion of 36%.

Exp. 168. 0.5 g of lime and 8 g of montmorillonite #21 slurried at 65° C. for 6 hours. Conversion of 47%.

Conclusions

Experiments with silicic acid and fly ash support the hypothesis that the reaction of added Ca(OH)$_2$ and silica from fly ash is responsible for the enhancement of Ca(OH)$_2$ utilization when slurried with fly ash, as compared with the utilization of lime alone. The newly formed solids are of high surface area and are highly hydrated. Prior to the formation of highly reactive solids of calcium silicate hydrates two steps apparently need to take place: Ca(OH)$_2$ dissolution and digestion of silica from the fly ash. Since Ca(OH)$_2$ dissolution is very fast compared with fly ash dissolution, digestion of silica from fly ash seems to be the rate controlling step. This was confirmed by experiments with silicic acid, precipitated silica, and precipitated calcium silicate. However, the high price of precipitated silica ($750–1750/ton) make it noneconomic. Therefore enhanced calcium silicate hydrate formation should be sought by carefully selecting slurrying conditions rather than using costly additives.

Experiments showed that increasing slurrying time and temperature can dramatically enhance the utilization of Ca(OH)$_2$. At each temperature the Ca(OH)$_2$ utilization asymptoted to a specific maximum value with increasing time. The time needed to achieve the maximum utilization varied and was generally higher for lower slurrying temperatures. A step increase of reactivity was observed between solids slurried at 55° and 65° C. It took 15 hours to converge on 80% conversion of Ca(OH)$_2$ at 65° C.

When lime was slurried with fly ash and calcium sulfite or calcium sulfate the formation of ettringite was observed. The addition of calcium sulfite/sulfate enhanced utilization when slurried at 25° C. at the fly ash/lime/calcium salt weight ratio of 16:1:14. The effect was dramatic when calcium sulfate was used.

Experiments with clays as an alternate source of silica proved that they also may be effective in the formation of calcium silicate hydrates. Montmorillonite performed as well as fly ash at a loading of 2. At high loading it was only slightly less effective. The use of clays in the place of fly ash offers the advantage of uncontaminated by-product fly ash.

Also from the above presented results it becomes clear that fly ash TAMO (total alkaline metal oxide content) has no decisive effect on the removal of SO$_2$ in the spray dryer when slurried alone, the recycle of spray dryer/bag filter off-product provides the opportunity for unspent Ca(OH)$_2$ to be reacted with fly ash in addition to providing the unspent Ca(OH)$_2$ with another chance to see and react with SO$_2$, enhancing the reaction of Ca(OH)$_2$ with fly ash in the recycle system should improve the overall performance of the spray dryer/bag system.

The advantage of highly reactive solids may be fully utilized in a commercial unit after optimization of the recycle conditions. Presently it is commercial practice to design the recycle tank for about 2 hours residence time. At ambient temperature or adiabatic conditions the effect of heat evolving when warm spray dryer solids are added is negligible. As shown by the results of this study, it would be preferred to increase the size of recycle tank up to 6 hours, preferably even 8 hours. The temperature of the slurry should preferably not be lower than 65° C. to take advantage of a steep change in a reactivity of solids. One option to provide the necessary amount of heat would be to add fly ash directly to the CaO slaker. The recycle tank should be designed carefully to avoid problems with plugging from reaction products and excessive deposit built-up on the walls.

It is possible that the spray dryer could be operated with wider approach to the saturation temperature because more reactive solids would be sprayed. Additional increase of Ca(OH)$_2$ reactivity in the fly ash-Ca(OH)$_2$ system might be possible with deliquescent salt additives. Sand bed studies showed the increase of Ca(OH)$_2$ reactivity when calcium and sodium salts were used. Sodium and calcium salts are widely used as cement retarders and by analogy they should work well also in the fly ash system.

The lab scale experiments also indicate that dry injection of solids into the duct should be accompanied by humidification of the gas. High humidification could be used in installations with ElectroStatic Precipitators (ESP). One option is that the dry solids would be produced outside the system and then injected into the duct and later humidified. Second is that the reacted slurry of fly ash and lime would be introduced into spray dryer operating at wide approach to the saturation. This spray dryer would operate as dryer and absorption of SO$_2$ would be of secondary concern. Spray dryer-dry solids would be then passed into the duct where they would contact humidified gas. Dry injection in the system with ESP requires additional laboratory studies of the rates of reaction at short times.

The idea of producing the reactive solids could be also retrofitted into existing desulfurization installations. It should be feasible for example to collect the product solids from Limestone Injection Multistage Boiler (LIMB), slurry them at favorable conditions and redistribute. The typical product of LIMB is CaO, CaSO$_4$, and fly ash at the ratio of 3:1:2, which could be simulated in sand bed reactor.

Still another possibility would be Slurry Atomization into Multistage Burner (SAMB) which would consist of spray drying of lime/fly ash slurry at burner temperatures and collecting th dry solids in either ESP or bag filter after additional humidification in the duct.

EXAMPLE II

The Effect of NaOH Addition to the Slurry

Figure 12:
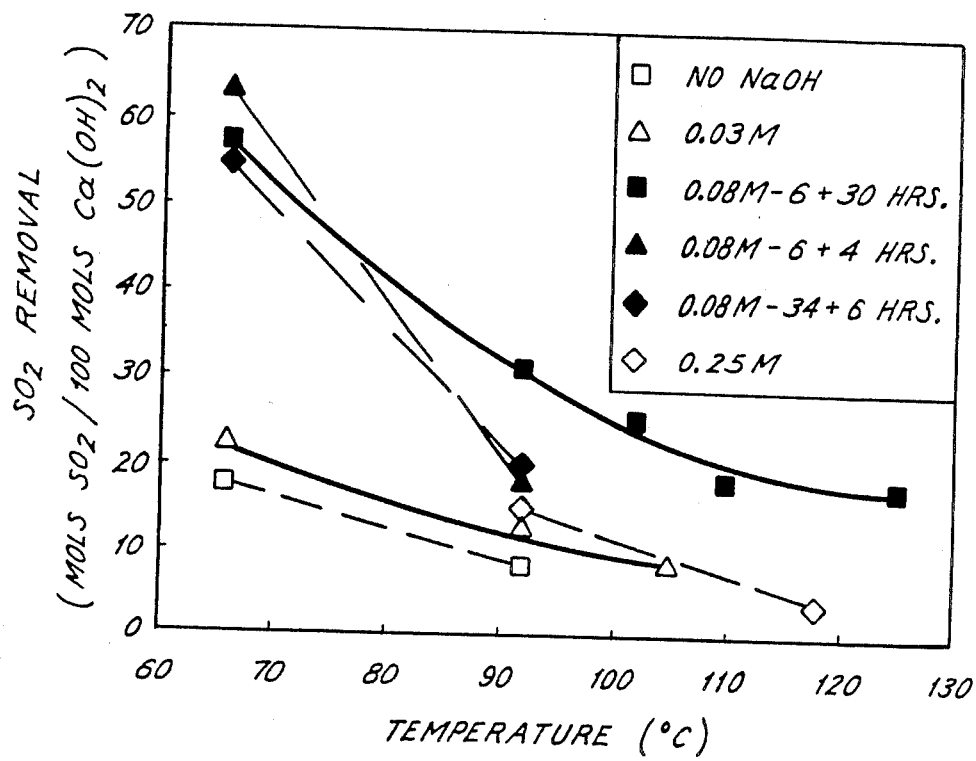
FIG. 12—Effect of NaOH concentration on $SO_2$ removal. 1 $Ca(OH)_2$:4 Fly Ash:4 $CaSO_3$—10 mol % NaOH; Removal after 1 hour; 500 ppm $SO_2$; 500 ppm $NO_x$; 14 mol % $H_2O$; gas flow: 4.6 l/min—7% $O_2$, 10% $CO_2$; 83% $N_2$.

It has also been observed that the addition of sodium hydroxide to the slurry serves to potentiate the slurry's sulfur-adsorbing capability, possibly due to the increased formation of calcium silicates and aluminates at more alkaline pH's. In FIG. 12, about 1 part $Ca(OH)_2$ was slurried at 65° C. for 6 hours with 4 parts fly ash and 4 parts $CaSO_3$, but without the addition of NaOH. $SO_2$ removal (moles $SO_2$/100 moles $Ca(OH)_2$) ranged from about 20, when solids were reacted with gas at about 65° C., to about 10, when reacted with gas at about 92° C.

When 0.03M NaOH was added to a level of 10 mole %, the $SO_2$ removal ranged from about 22, when reacted with gas at 65° C., to about 10, when reacted with gas at about 105°. When 0.08M NaOH was added after the slurry was slurried for 6 hours, and then dried an additional 30 hours in the presence of the added NaOH, the $SO_2$ removal increased to a range of about 58, when reacted with gas at 65° C., to about 30, when reacted with gas at about 92° C., and to about 22, when reacted with gas at about 125° C. When this concentration of NaOH was slurried for only 4 hours, the $SO_2$ removal observed ranged from about 64, at 65° C., to about 20, at 92° C. A longer slurrying time prior to NaOH addition gave similar results. The addition of 0.25M NaOH demonstrated only slight improvement over control. However, in all cases, it was observed that the addition of NaOH to the slurry improved $SO_2$ removal efficiency.

PROCESS ALTERNATIVES

The following discussion addresses the components of alternative processes that could utilize the reaction of $SO_2$ with dry CaO solids promoted by reaction with fly ash or other sources of silica. A complete process can be created by selecting one option from each component.

1. Primary Alkali

Limestone and lime are the only economically feasible primary alkali additives. Limestone ($CaCO_3$) is not very reactive unless ground to a superfine powder. Boiler injection of limestone (LIMB) obtains reactivity by the high temperature contact and by calcining the stone to lime. However limestone alone could probably not be used for tailend injection.

Lime (CaO) is reactive at boiler temperatures, but must probably be hydrated to $Ca(OH)_2$ to react at tailend temperatures. Inexpensive lime may be generated in situ by boiler injection of limestone. Hydrated lime may be produced as a dry solid, as in pressure hydration, or as an aqueous slurry. Hydrated lime may be produced as a dry solid, as in pressure hydration, or as an aqueous slurry by slaking. Slaking is a cheaper procedure and gives hydrated lime of comparable reactivity. The reactivity of $Ca(OH)_2$ can be enhanced by addition of salts such as NaCl or by slurry reaction with fly ash to give calcium silicate.

2. Primary Enhancing Reaction: Fly Ash or Clay

This set of alternatives will likely be limited to systems that enhance lime reactivity by reacting it with fly ash or other sources of silica or clays. The best results with fly ash have been obtained by slurrying at 90° C. for 4 to 16 hours. With more reactive sources of silica, the reaction conditions probably do not have to be as stringent.

The enhancing reaction may be carried out simultaneously with lime slaking or as a separate reaction. Continuous or batch reaction could be used. A continuous slaker/reactor would serve best to retain the heat of reaction. A ball mill slaker might be the easiest way to avoid plugging by the reaction products. However benchscale work has used a simple stirred reactor. Continuous reaction may give solids of different properties than batch reaction, because solution and solids composition will be different during the progress of the reaction.

Multistage (2 or more) continuous reaction could be considered to enhance solids properties and minimize water usage. For example, lime and fly ash could react in the first stage followed by addition of diatomaceous earth in the second stage. Water usage would be minimized by sequential addition of dry reactants, to the ultimate extreme of producing a dry solids where free water has been absorbed into the calcium silicate gel.

Temperature may be partially provided by the heat of reaction of lime slaking and of the hydroxide silica reaction. Additional temperature would best be provided by heating the makeup water in a heat exchanger or by addition of steam.

Water content of the slurry should be minimized to reduce drying requirements. Drying constrains the amount of recycle solids that can be processed as slurry. However, sufficient water must be present to allow agitation for mass transfer and to provide hydration water for the calcium silicate gel product.

If fly ash is used, the simplest source is recycle solids from the particulate collector including product calcium sulfite. The sulfite may react to give calcium aluminum silicate sulfites that have properties different from the calcium silicate. In some cases it may be possible to give a pure source of fly ash by removing it before the FGD system or obtaining it from a parallel without FGD.

3. Other Additives: NaOH or Salts

The reactivity of the calcium silicate produced may be enhanced by addition of NaOH or salts such as NaCl, $CaCl_2$, and $NaNO_3$.

Salt additives such as $CaCl_2$ and $NaNO_3$ probably enhance reactivity by acting as deliquescent agents that increase the amount of adsorbed water on the surface of "dry" solids. NaCl is also effective, but is not an effective deliquescent agent, so this mechanism may not be correct. These salt additives seem to require 40 to 80% relative humidity (RH). Work has shown that 10 mole % NaCl enhances reagent $Ca(OH)_2$ conversion from 12% to 30% at 54% RH. Work needs to be done to determine the interaction of salt additives with calcium silicate materials. Equivalent enhancement may not be possible with slaked lime.

NaOH enhances the reactivity of lime/fly ash materials to $SO_2$ and $NO_x$. The NaOH probably enhances dissolution of the fly ash, serves as a deliquescent agent, and provides some additional alkali for $SO_2/NO_x$ absorption. Effective $NO_x$ removal requires higher temperature (90°–110° C.) and probably longer contact time (probably requiring a bag filter). Addition of $Na_2CO_3$ should have the same effect as NaOH since it reacts with $Ca(OH)_2$ to give NaOH.

Soluble additives can increase the environmental impact of waste solids by causing leaching, although coprecipitation and formation of insoluble solid phases may immobilize what would otherwise be insoluble solids.

4. Solids Collection Point of Reaction

The dry product solids may be collected by bag filters, electrostatic precipitators, or possibly cyclones. Reaction between $SO_2$ and $Ca(OH)_2$ solids may occur primarily in these devices or it may occur in the ductwork.

The laboratory rate studies have shown that good lime utilization can be obtained at solids residence time typical of bag filters (10 to 60 minutes). Bag filters also provide intimate contact between gas and solids. Therefore bag filters would be preferred for enhancing $SO_2$ removal without relying on additional contacting such as a spray dryer. Furthermore contact in ESP's, cyclones, and duct work is not likely to be effective because of short solids residence time or poor gas phase mass transfer. Bag filters are probably the best alternative for a new plant that must invest in particulate removal devices in any case.

It would be desirable to get gas-solid reaction in an existing electrostatic precipitator (ESP). Because most of the solids are collected in the first section the $SO_2$ removal would have to occur in that section. The solids residence time on the plates depends on the rapping cycle and would typically be about 5 to 15 minutes. Available laboratory data have not investigated this shorter time, but extrapolations of available data would suggest that good performance could be obtained. However, $SO_2$ removal would probably be limited by gas phase mass transfer. With turbulent flow (4 ft/s), plate spacing of 1 ft with a flow length of 10 ft should give only 0.04 gas-phase transfer units in the first section, equivalent to a maximum $SO_2$ removal of 4%. At least 2.3 transfer units in the first section equivalent to a maximum $SO_2$ removal. Additional mass transfer capability could be obtained by reducing plate spacing or by changing flow patterns to increase the gas velocity while utilizing the same amount of total plate area. However, precipitator plates are typically not preferred for gas/solid reactions.

It is generally desirable to obtain gas/solid reactions in the ductwork with entrained solids. However, the solids residence time available would be much lower, on the order of 1 to 3 seconds in the ducts and 2 to 10 seconds in the ESP. Some experiments have been run with solids prepared by reacting 1 part silicic acid with 1 part CaO and it was found that these solids gave 15% conversion in 10 seconds at 80% relative humidity. More reactive solids such as CaO/diatomaceous earth will likely do better than this.

A circulating bed contactor, probably with cyclone and ESP separators, could be used to increase the residence time of the solids in the gas. It might add to the capital cost of the primary system, but would have other advantages. In addition to providing for $SO_2$ removal, a circulating bed could be used to dry the sorbent and to humidify the flue gas without an atomizer. Problems with this contactor could include high pressure drop, gas/solid distribution, and particle size control to maintain contact time. In a retrofit application, this contactor would allow use of an existing precipitator but might not be much more attractive than adding a spray dryer. In a new application, it might not be as attractive as using a bag filter with dry injection, except that sorbent drying and gas humidification are simplified.

Other contacting types could also be used. A moving bed of inert material could serve as a sort of packed column to retain solids. The reactive solids could be screened from the packing external to the reactor. Simple screens, sieve plates, chevrons or more complex impactor devices could be used to provide surface area for gas/solids contact and to slow down the solids and provide increased solids residence time.

5. Gas Temperature and Humidity

The lab work has shown that high relative humidity (30 to 80%) is necessary to get good lime utilization. It is improbable that adequate reaction rates could be obtained at higher temperatures. Tests by Yang and Shen (AIChE J. 25:811, 1979) with synthetic calcium silicates at 900° C. required 20 minutes to get 25% conversion.

The easiest way to humidify the flue gas is to atomize water or reactant slurry. Slurry atomization would require some kind of spray dryer, but would also provide for additional $SO_2$ removal by gas/solution reaction. Water atomization would be much simpler, by two-fluid or high pressure single-fluid nozzles in the duct, but might require the addition of some alkali solids beforehand to avoid corrosion by condensation of sulfuric acid mist. If all of the solids are added before humidification, the spray may "collect" some solids and behave as a spray dryer with enhanced $SO_2$ removal, but with increased potential for deposits.

Injection of "damp" of wet solids in the flue gas could also be used to provide humidification. With adequate quantities of solids recycle containing retained moisture, it should not be necessary to add water to the flue gas. If the solids are too wet or do not dry in the available contact time in the duct, deposits and plugging may be a problem. If possible, the solids should be free flowing when injected. A circulating contactor would be ideally suited for use of damp solids.

Flue gas could also be "humidified" by cooling in a heat exchanger. Because $SO_3$ would probably be removed by the alkali solids, cooling to lower temperature should be possible without corrosion problems. However, the heat exchanger surfaces would be much cooler than the flue gas, therefore water condensation (with plugging and corrosion) could occur at lower gas temperature and higher relative humidity.

6. Reactant Solids Distribution/Drying

The alkali could be introduced into the flue gas as dry solid or as slurry to be dried. However, reactive slurry must be dried somehow. The drying load would be minimized by once-through use of a very reactive sorbent. The drying load would be greatest with a large slurry recycle of CaO/fly ash/$CaSO_3$.

Dry solids could be pneumatically introduced into the boiler (LIMB) or into the downstream ductwork. Dry solids injection is simpler, but fly ash-promoted $Ca(OH)_2$ slaked lime, and other alkali reagents are more easily available as aqueous slurries. To be most effective, the dry solids must be reduced to small particles.

Slurry could be atomized into the low temperature flue gas as in conventional spray drying, but close approach to saturation would not be necessary for solids distribution. It might be easier to introduce slurry at a higher temperature point where drying would be very rapid and atomization would not be as critical. Typical slurries might reduce gas temperature by 50° to 150° C., but the loss in thermal efficiency should not be prohibitive in retrofit systems. It might be feasible to spray slurry directly on the filter bags.

If cost-effective, reactant slurries could be dried externally and injected as dry solids. A spray dryer operating on flue gas could prepare excess dry solids for use in a parallel unit. However the most reactive part of the solids would utilized in the spray drying unit, leaving less reactive solids for the unit using dry injection, where the reactivity would be critical.

Drying by hot clean gas in fluid beds, rotary dryers, or spray dryers, could be considered, but would probably be prohibitive in cost unless concentrated slurries could be prepared before drying. The amount of energy required for external drying is significant and must be minimized. Pilot plant data suggest that it would be feasible to concentrate the slurries with rotary drum or belt vacuum filters. The filtered solids could then be dried in a flash or fluid bed dryer.

System reliability will not be good with integrated dewatering and drying. Sparing will be required for dryers, filters, and conveyors. That must be operated at the same time as the boiler. Mechanically, it would not be a simple system.

Offsite drying could reduce capital cost by allowing economies of scale and continuous operation. Offsite drying also enhances system reliability. However, hot flue gas and dry recycle solids for blending would not be available and the cost of heat could be prohibitive. Furthermore, the solids must be collected after drying for storage and shipping. With integrated drying systems, the dryer becomes the means of distributing the solids into a gas stream. Offsite drying would be attractive if the solids are allowed to set-up, although it might still be desirable to include recycle solids in the mix.

With a moving, fluidized, or circulating bed contactor, it may be possible to introduce wet solids or slurry directly into the flue gas.

7. Recycle of Product Solids: none, dry, or slurry

Recycle of product solids may be effective in enhancing system performance by increasing the concentration of reactive solids in the flue gas and by generating more reactive solids in the case of slurries with fly ash. Greater recycle ratios are feasible with lower sulfur loadings.

Any recycle would increase the particulate loading to the collection device and could increase pressure drop or reduce collection efficiency. The maximum amount of recycle is frequently limited by the capacity of the particulate removal device. Use of cyclones could increase the maximum amount of recycle. If a bag filter is constrained by pressure drop, recycle will require reduced cycle time, so the net effect should be to give about the same solids residence time.

Recycle of dry solids produces no additional need for water evaporation and effectively increases the overall solids residence time. Dry solids recycle would make the most difference when used with solids separation by ESP or cyclones. The effect of increased residence time would be less apparent with bag filters or with contactors such circulating beds that already provide large solids residence time. Dry solids recycle could also be used to blend with reactive slurry or wet solids to produce a dry additive.

Recycle as aqueous slurry is usually necessary to get fly ash reaction with $Ca(OH)_2$ and for CaO to be hydrated (with LIMB solids). Otherwise the fly ash must be removed before the FGD system. These reactions would be enhanced by increased time and temperature. Because the resulting solids are cementatious in nature, processing and handling may be difficult. Temperature and processing equipment could be obtained by feeding the recycle solids with makeup CaO to the slaker. The amount of slurry recycle would be limited by the amount of water that can be economically evaporated. A combination of dry and slurry recycle might allow for a greater total recycle.

Slurry recycle with fly ash or fly ash/clay may increase the effectiveness of the lime/silica reaction. The recycle material will contain reactive silica released by the reaction of $SO_2$ with calcium silicate. Slurry recycle will also reduce the required feed of net fly ash or clay to the system.

Slurry recycle will not be as attractive with clay as a source of silica. The recycle solids will contain fly ash which will dilute the clay. However, if most of the fly ash is removed by a device such as a cyclone before adding the lime/clay reagent slurry recycle could serve to better utilize the clay. With a 2/1 recycle, a fresh feed of 3 CaO/1 clay would provide stoichiometry of 1/1 in the slurry recycle tank.

Any form of recycle has fewer advantages if used with "offsite" processing of the lime/silica reactants. Dry recycle could not be used to blend with wet reagent solids. Slurry recycle would not be used to enhance solids reactivity.

Process Combinations

A complete process can be generated by selecting one option from each component. For example a conventional spray drying process with slurry recycle would be represented by:
1. Slaked lime as primary additive.
2. Fly ash as promoting additive.
3. Bag Filter as the point of reaction and collection device.
4. No additional additives.
5. Spray dryer as a humidification device.
6. Spray dryer (same) for solids distribution.
7. Slurry recycle.

In such a process the reaction of fly ash with slaked lime should enhance the $SO_2$ removal in the bag filter.

An evolutionary improvement on the conventional process would be the combination: 1. slaked lime/2. fly ash/3. no additive/4. bag filter/5. water atomization/6. spray dryer/7. slurry recycle. In this process the gas is humidified by water atomization. This means that the spray dryer used for solids distribution can be operated with a large temperature driving force. If desirable it could even be operated at higher temperature conditions, such as before the air preheater. Therefore the dryer should be much smaller and easier to operate than a conventional system. The combination of a spray dryer at high temperature and water atomization with a close temperature approach should be less expensive than a conventional spray dryer.

A very attractive process for new plants is 1. lime/2. fly ash/3. NaOH-NaCl/4. bag filter/5. water atomization/6. Set-up with ball mill/7. slurry recycle. Fly ash is cheaper than diatomaceous earth and very high reactivity is not needed with the bag filter. NaOH and NaCl are inexpensive additives that can be optimized to get satisfactory $SO_2$ removal and lime utilization. A bag filter should be used in new plants since particulate removal is required in any case. Water atomization will still be necessary but can probably be accomplished with simple nozzles in the duct. Drying by setting up the solids with a ball mill allows isolation of the solids preparation from the boiler load. Slurry recycle through the slaker and solids prep system must be optimized to provide reactivity while minimizing costs.

In existing plants an attractive alternative is 1. lime/2. fly ash/3. NaOH-NaCl/4. circulating bed/5. circulating bed/6. circulating/7. slurry recycle. The circulating bed contractor will probably be necessary to get $SO_2$ removal; therefore it is also attractive to use it for drying and humidification.

A very attractive process ould be to use the ESP and ductwork as the point of reaction. One such process would be the process using LIMB solids: 1.limestone/2. fly ash/3. no additives/4. ESP-duct/5. water atomization/6. spray dryer/7. slurry recycle. To be effective, the solids formed by reaction of fly ash and lime must be reactive at times from 1 to 10 seconds. Alternatively this process could be modified to do without humidification, counting on the reaction of the solids in 0.1 to 2 seconds at higher temperatures in the boiler or upstream ductwork, as in LIMB.

What is claimed is:

1. A process for reducing the level of sulfur, the sulfur being generally in the form of sulfur dioxide in a sulfur dioxide-containing gas, comprising the steps of:
   (a) preparing an aqueous slurry comprising a calcium alkali together with a calcium-reactive silica or alumina which are present in amounts sufficient to allow for the formation of a sulfur dioxide-absorbing component which includes a calcium silicate or calcium aluminate;
   (b) heating the slurry to a temperature between about 40° and about 200° C. to facilitate in the formation of the sulfur dioxide-absorbing component;
   (c) atomizing the slurry into a stream of the sulfur dioxide-containing gas;
   (d) drying the resulting atomized droplets so as to form a gas/solid suspension having a gaseous component and a solid component which includes the sulfur dioxide-absorbing component;
   (e) retaining the gaseous and solid components in contact in a manner sufficient to allow for the absorption of sulfur dioxide by the absorbing component; and
   (f) separating the absorbing component in the form of spent solids from the gas.

2. The process of claim 1 further comprising directing the gas/solid suspension onto a reaction surface to allow for deposition of the solid component onto the surface; and passing the suspension over the deposited solid component to further effect the absorption of sulfur dioxide by the absorbing component and to effect a separation of the gas from the solid component.

3. The process of claim 2 wherein the reaction surface comprises a bagfilter.

4. The process of claim 1 further comprising carrying the gas/solid suspension in a stream to allow for substantial contact between the gaseous and solid component and separating the solid component from the gas by means of an electrostatic precipitator or cyclone.

5. The method of claim 1 further comprising recycling a portion of the spent solids to the aqueous slurry.

6. The process of claim 1 wherein the slurry comprises an admixture of sulfur doxide-absorbed solids and a calcium alkali.

7. The process of claim 1 wherein the calcium alkali is introduced into the slurry in the form of lime, slaked lime, hydrated lime, calcidic lime, dolomitic lime, calcium hydroxide or calcium oxide and the reactive silica or alumina is introduced in the form of fly ash, clay, bentonite, montmorillonite, activated alumina, or silicic acid.

8. The process of claim 1 wherein the slurry is heated to between about 40° and about 100° C. for between about 0.5 and about 48 hours.

9. The process of claim 1 wherein the slurry is heated to between about 40° and about 60° C. for between about 2 and about 36 hours.

10. The process of claim 1 wherein the slurry is heated to between about 40° and about 60° C. for between about 4 and about 12 hours.

11. The process of claim 1 wherein the slurry is heated to between about 60° and about 80° C. for between about 1 and about 24 hours.

12. The process of claim 1 wherein the slurry is heated to between about 60° and about 80° C. for between about 2 and about 12 hours.

13. The process of claim 1 wherein the slurry is heated to between about 80° and about 100° C. for between about 0.5 and about 12 hours.

14. The process of claim 1 wherein the slurry is heated to between about 80° and about 100° C. for between about 1 and about 8 hours.

15. The process of claim 1 wherein the slurry comprises a mass ratio of calcium-reactive silica or alumina to calcium alkali ranging from about 1:1 to about 16:1, respectively.

16. The process of claim 1 wherein the slurry comprises a mass ratio of calcium-reactive silica or alumina to calcium alkali ranging from about 1:1 to about 5:1, respectively.

17. The process of claim 1 wherein the slurry comprises about 1 to 3 moles of calcium alkali for every mole of sulfur to be removed from the gas.

18. The process of claim 1 wherein the slurry comprises about 1 to 2 moles of calcium alkali for every mole of sulfur to be removed from the gas.

19. The process of claim 1 wherein the slurry further comprises sodium hydroxide in a concentration ranging from about 0.03M to about 1M.

20. The process of claim 1 wherein the slurry further comprises sodium hydroxide in a concentration ranging from about 0.05M to about 0.5M.

21. The process of claim 1 wherein the slurry further comprises sodium hydroxide in a concentration ranging from about 0.1M to about 0.25M.

22. The process of claim 1 wherein the slurry further comprises from about 0.02 to 0.3 moles of sodium hydroxide for every mole of calcium alkali.

23. The process of claim 1 wherein the slury further comprises from about 0.05 to 0.2 moles of sodium hydroxide for every mole of calcium alkali.

24. A process for reducing the level of sulfur, the sulfur being generally in the form of sulfur dioxide in a sulfur dioxide-containing gas, comprising the steps of:
   (a) preparing an aqueous slurry comprising a mass ratio of a calcuim-reactive silica or alumina to calcium alkali ranging from about 1:1 to about 16:1, respectively, with about 1 to about 3 moles of caloium alkali for every mole of sulfur to be removed from the gas;
   (b) heating the slurry to between about 40° and 200° C. for between about 0.5 and 48 hours;

(c) atomizing the slurry into a stream of the sulfur dioxide-containing gas;
(d) drying the resulting droplets so as to form a gas/solid suspension having a gaseous component and a solid component which includes a sulfur dioxide-adsorbing component;
(e) retaining the gas/solid suspension in a stream to allow for th absorption of sulfur dioxide by the absorbing component; and
(f) removing the sulfur dioxide from the gas by separating the solid component from the gaseous component.

* * * * *

UNITED STATES PATENT AND TRADEMARK OFFICE
CERTIFICATE OF CORRECTION

PATENT NO. : 4,804,521

DATED : February 14, 1989

INVENTOR(S) : Gary T. Rochelle and Wojfciech Jozewich

It is certified that error appears in the above-identified patent and that said Letters Patent is hereby corrected as shown below:

In the Claims:

In claim 6, line 67, column 31, delete "doxide" and insert -- dioxide --.

In claim 23, line 55, column 32, delete "slury" and insert -- slurry --.

In claim 24, line 65, column 32, delete "caloium" and insert -- calcium --.

In claim 24, line 3, column 33, delete "-".

In claim 24, line 1, column 34, delete "th" and insert -- the --.

Signed and Sealed this

Fifteenth Day of August, 1989

*Attest:*

DONALD J. QUIGG

*Attesting Officer*

*Commissioner of Patents and Trademarks*